(12) United States Patent
Kabasawa

(10) Patent No.: US 6,246,540 B1
(45) Date of Patent: Jun. 12, 2001

(54) DAMPING AND LATCH MECHANISM FOR A RECORDING MEDIUM RECORDING/REPRODUCING DEVICE

(75) Inventor: Hidetoshi Kabasawa, Saitama-Ken (JP)

(73) Assignee: Teac Corporation, Tokyo (JP)

( * ) Notice: Subject to any disclaimer, the term of this patent is extended or adjusted under 35 U.S.C. 154(b) by 0 days.

(21) Appl. No.: 09/257,101

(22) Filed: Feb. 24, 1999

(30) Foreign Application Priority Data

Feb. 26, 1998 (JP) .................................................. 10-045716

(51) Int. Cl.⁷ .................................................. G11B 17/04
(52) U.S. Cl. .................................................. 360/99.06
(58) Field of Search ............................... 360/99.02, 99.06

(56) References Cited

U.S. PATENT DOCUMENTS 5,696,650   12/1997   Kabasawa .
5,898,539 * 4/1999   Yokota .............................. 360/99.06

* cited by examiner

Primary Examiner—A. J. Heinz
(74) Attorney, Agent, or Firm—Anderson, Kill & Olick, P.C.

(57) ABSTRACT

A holder into which a recording-medium container is inserted is provided. A sliding member is supported slidably in a recording-medium-container loading direction. The sliding member moves the holder from a recording-medium-container insertion/ejection position to a recording-medium-container loading position as a result of sliding in the recording-medium-container loading direction. A latch member is rotatably supported. The latch member has a to-be-pushed portion which is pushed by the recording-medium container which is being inserted into the holder, and a movement-preventing portion which prevents the sliding member from moving in the recording-medium-container loading direction. A first force-applying member is provided. One end of the first force-applying member is connected with the latch member and the other end of the first force-applying member is connected with sliding member. The first force-applying member applies force such as to rotate the latch member to cause the latch member to be in a position such as to prevent the sliding member from moving. The first force-applying member applies force such as to move the sliding member in the recording-medium-container loading direction. A rotating member is rotatably provided within a sliding operation range of the sliding member. A second force-applying member is provided within the sliding operation range of the sliding member, one end of which is connected with the sliding member, and the other end of which is connected with the rotating member.

5 Claims, 21 Drawing Sheets

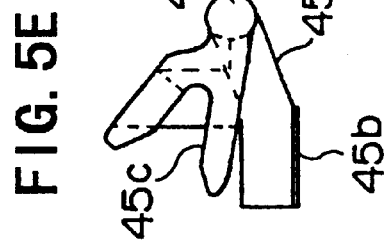
FIG. 5E
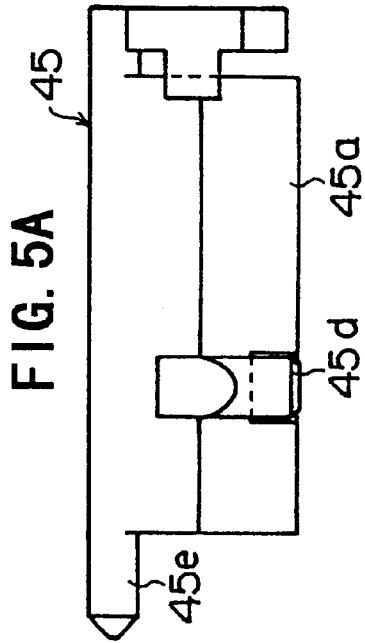
FIG. 5A
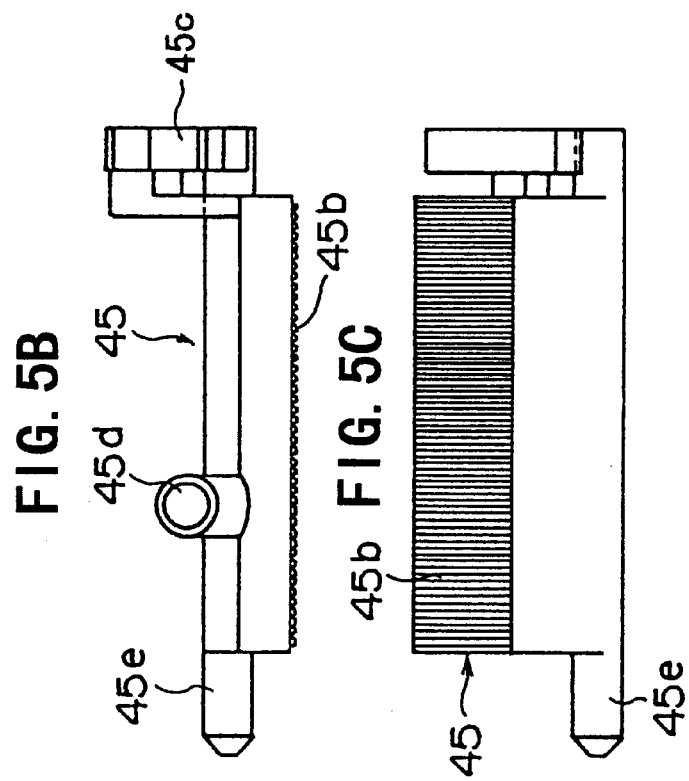
FIG. 5B
FIG. 5C
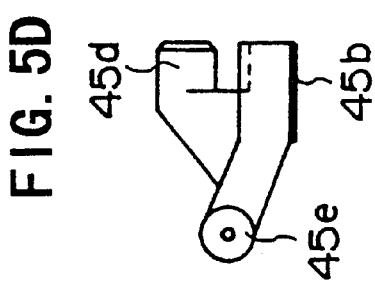
FIG. 5D

DAMPING AND LATCH MECHANISM FOR A RECORDING MEDIUM RECORDING/REPRODUCING DEVICE

BACKGROUND OF THE INVENTION

1. Field of the Invention

The present invention relates to a recording-medium recording/reproducing device, and, in particular, to a recording-medium recording/reproducing device having a head moving mechanism which causes a head to approach a recording medium in response to movement of the recording medium, which movement is performed by a recording-medium moving mechanism.

2. Description of the Related Art

In an electronic apparatus such as a personal computer, a word processor or the like, a magnetic disk device, for example, is provided as means for recording information. In the magnetic disk device, when a disk cartridge as a recording-medium container is loaded, a magnetic disk contained in the disk cartridge is rotated, and a magnetic head slides on the magnetic disk so as to perform magnetic recording/reproducing.

The magnetic disk device has a recording-medium moving mechanism which includes a disk holder in which the disk cartridge is inserted, and a slider which performs a sliding operation in response to a disk-cartridge inserting operation and moves the disk holder from a cartridge insertion/ejection position to a cartridge loaded position.

Force is applied to the slider in one direction by a coil spring or the like. When the disk cartridge is inserted, a latch lever is pushed by an end of the disk cartridge so as to rotate, and, thereby, prevention of movement of the slider by the latch lever is released. As a result, the slider slides in the direction in which the force is applied thereto, and moves the disk holder to the cartridge loaded position. At this time, as a result of the disk holder falling from the cartridge insertion/ejection position to the cartridge loaded position, the disk in the disk cartridge is chucked onto a turntable.

In order to positively perform this loading operation performed by the disk holder, the force of the spring to be applied to the slider is set to be strong. The slider is accelerated by the spring force during a time starting when the disk cartridge is inserted into the disk holder and ending when the disk cartridge is loaded, and, then, the slider slides at an approximately fixed speed. Therefore, at a time when the slider reaches a sliding completion position, the magnetic head comes into contact with the magnetic disk so strongly that a magnetic film on the surface of the magnetic disk may be damaged.

In order to eliminate such a problem, in the device in the related art, a damper for decelerating the slider is provided. An oil damper is used as such a damper. The oil damper includes a gear engaging with a rack provided on the slider, a rotating body which rotates together with the gear, and a container which is filled with grease and contains the rotating body. In this oil damper, when the rotating body provided in the container rotates as a result of the slider sliding, the rotating body is decelerated due to viscosity resistance of the grease provided in the container, and the slider is decelerated.

However, in the above-described disk device in the related art, the viscosity of the grease provided in the container depends on the temperature. That is, when the temperature is low, the viscosity resistance of the grease is so large that it is not possible to positively perform the loading operation of the magnetic disk. Further, when the temperature is high, because the viscosity resistance of the grease is small, the loading operation is performed so strongly that the magnetic film of the magnetic disk may be damaged.

Further, in the magnetic disk device, achievement of high-density recording has been attempted as a result of the rotation speed of the magnetic disk being increased, and, thus, the storage capacity of the magnetic disk has been increased. In such a type of a magnetic disk device, buoyant force, caused by an air flow generated due to high-speed rotation of the magnetic disk, is applied to the magnetic head. Thereby, magnetic recording/reproducing can be performed in a condition in which the magnetic head slightly floats above the magnetic disk so that the surface of the magnetic disk is not damaged.

However, in a condition in which the magnetic disk rotates at low speed, no sufficient buoyant force is applied to the magnetic head. Therefore, when the magnetic head is caused to approach the magnetic disk in the condition in which the magnetic disk rotates at low speed, the magnetic head comes into contact with the magnetic disk, and, as a result, a possibility that the magnetic film formed on the surface of the magnetic disk is damaged is high.

Further, in the magnetic disk device in the related art, a force-applying member which applies force to a latch member to rotate the latch member to a position such that the slider is prevented from moving by the latch member, and a force-applying member which applies a force to the slider in the loading direction are provided separately. Therefore, time is required for mounting the force-applying members, and the number of components increases.

SUMMARY OF THE INVENTION

An object of the present invention is to provide a recording-medium recording/reproducing device in which the above-mentioned problems are solved.

A recording-medium recording/reproducing device, according to the present invention, comprises:

a holder into which a recording-medium container is inserted;

a sliding member supported slidably in a recording-medium-container loading direction, the sliding member moving the holder from a recording-medium-container insertion/ejection position to a recording-medium-container loading position as a result of sliding in the recording-medium-container loading direction;

a latch member rotatably supported, the latch member having a to-be-pushed portion which is pushed by the recording-medium container which is being inserted into the holder, and having a movement-preventing portion which prevents the sliding member from moving in the recording-medium-container loading direction;

a first force-applying member, one end of the first force-applying member being connected with the latch member and the other end of the first force-applying member being connected with sliding member, the first force-applying member applying force such as to rotate the latch member to cause the latch member to be in a position such as to prevent the sliding member from moving, the first force-applying member applying force such as to move the sliding member in the recording-medium-container loading direction;

a rotating member rotatably provided within a sliding operation range of the sliding member; and a second force-applying member provided within the sliding operation range of the sliding member, one end of the second force-applying member being connected with the sliding member, the other end of the second force-applying member being connected with the rotating member.

In this arrangement, one end of the second force-applying member is connected with the sliding member and the other end of the second force-applying member is connected with the rotating member. Thereby, without using the high-priced oil damper or the like, the sliding operation of the sliding member can be decelerated through a mechanical operation. As a result, an operation of the head is decelerated when the recording-medium container is loaded, the head is prevented from hitting the recording medium strongly, and the recording medium is prevented from being damaged when the head comes into contact with the recording medium. Further, when the recording-medium container reaches the recording-medium container loading position together with the holder, the direction in which the second force-applying member applies force to the sliding member is reversed due to a rotation operation of the rotating member, and, thereby, the second force-applying member applies the force to the sliding member in the recording-medium-container loading direction. As a result, the holder is maintained in the recording-medium-container loading position. Further, the setting space is reduced, and, also, the device can be thin.

Further, one end of the first force-applying member is connected with the latch member and the other end of the first force-applying member is connected with the sliding member, the first force-applying member applies force such as to rotate the latch member to cause the latch member to be in a position such as to prevent the sliding member from moving, and the first force-applying member applies force such as to move the sliding member in the recording-medium-container loading direction. Thereby, in comparison to a case where a force-applying member for the latch member and a force-applying member for the sliding member are provided separately, it is possible to reduce the number of components. As a result, the assembly work can be simplified, work efficiency can be improved, and the manufacturing cost can be reduced.

Other objects and further features of the present invention will become more apparent from the following detailed description when read in conjunction with the accompanying drawings.

BRIEF DESCRIPTIONS OF DRAWINGS

FIGS. 5A, 5B, 5C, 5D and 5E show an arrangement of a carriage stopper;

DETAILED DESCRIPTION OF THE PREFERRED EMBODIMENT

One embodiment of a recording-medium recording/reproducing device according to the present invention will now be described with reference to drawings.

Figure 1:
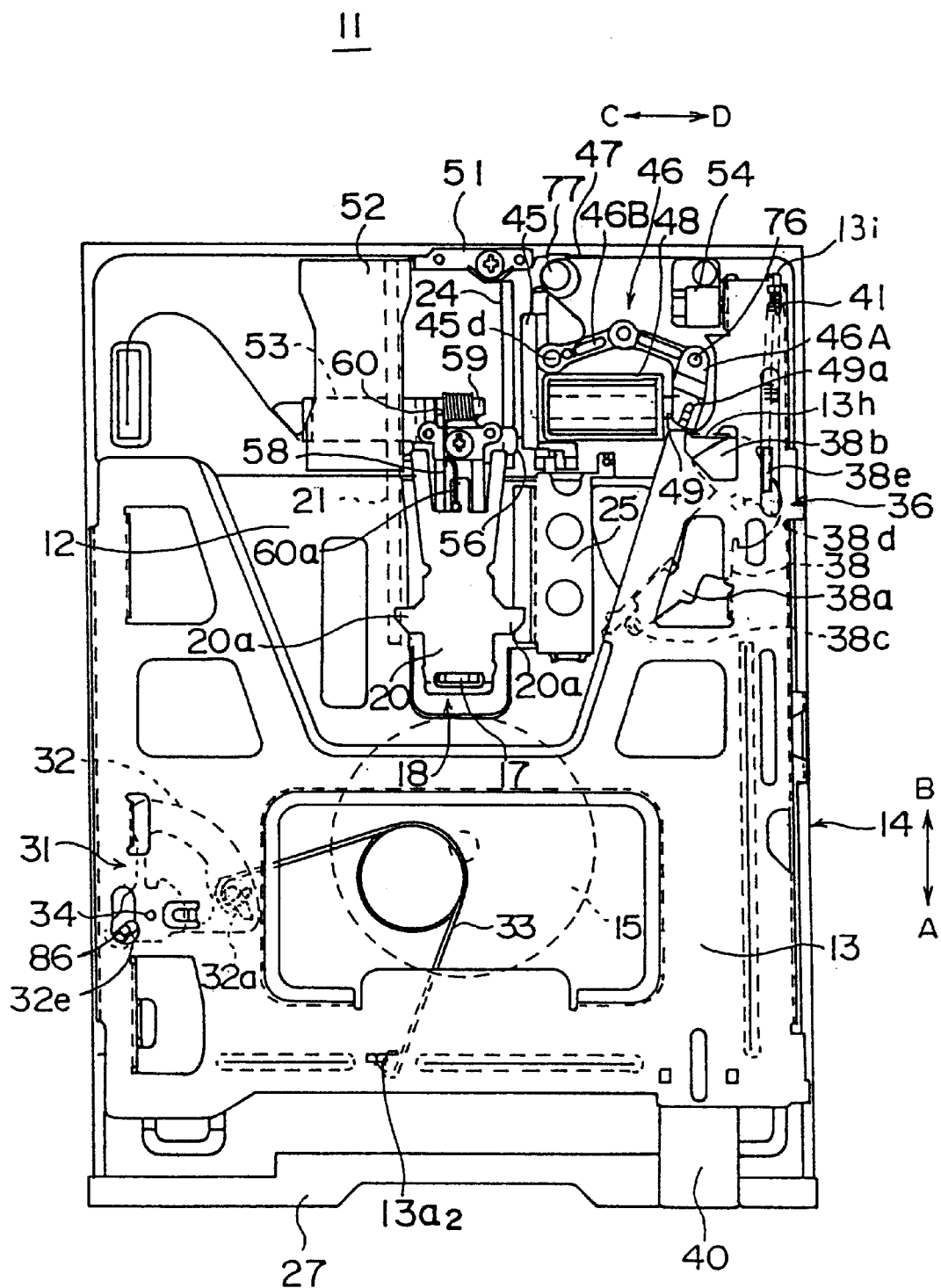
FIG. 1 shows a plan view showing a magnetic disk device in one embodiment of a recording-medium recording/reproducing device according to the present invention.
Figure 1A:
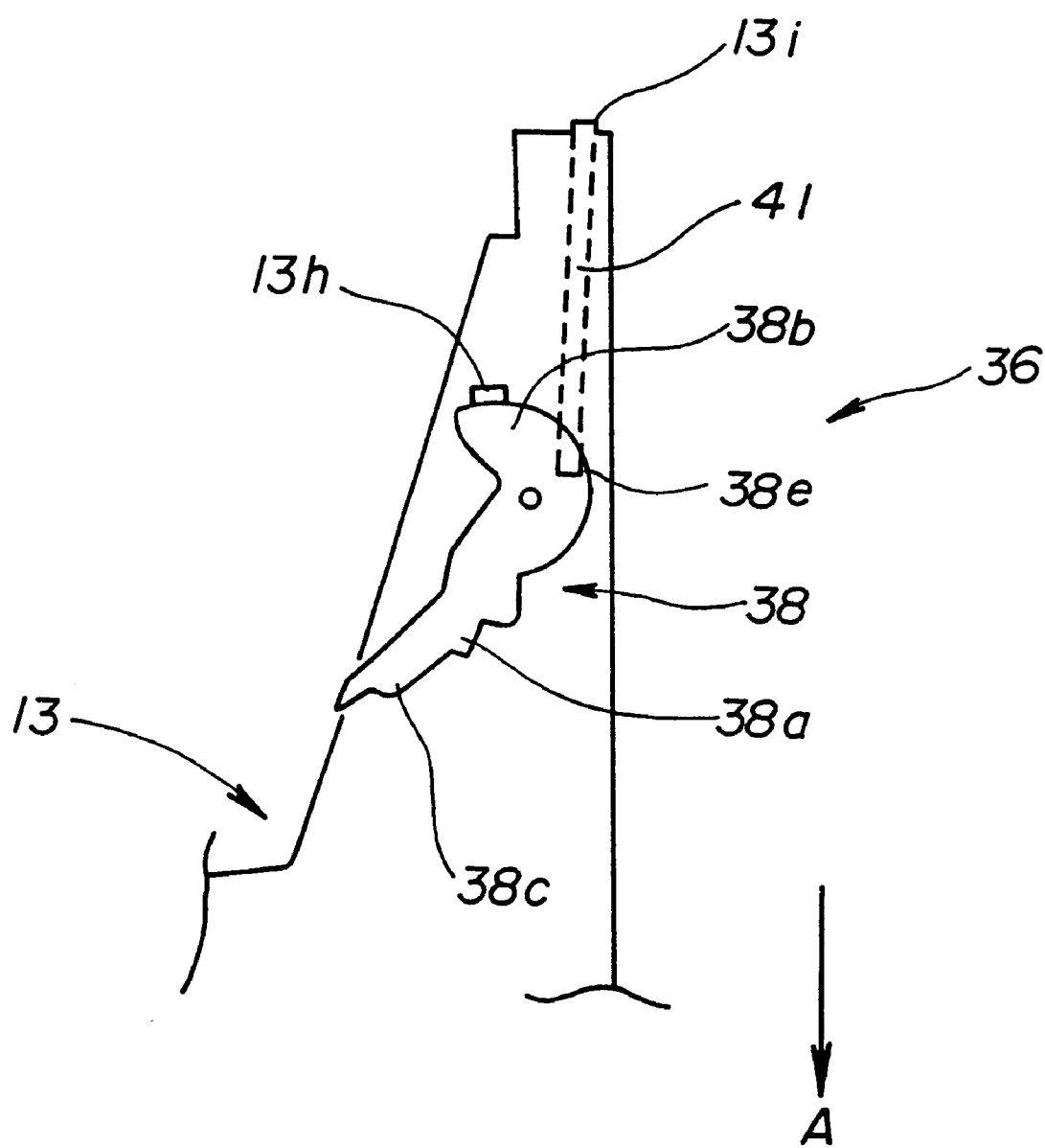
FIG. 1A shows a plan view of a latch mechanism.
Figure 2:
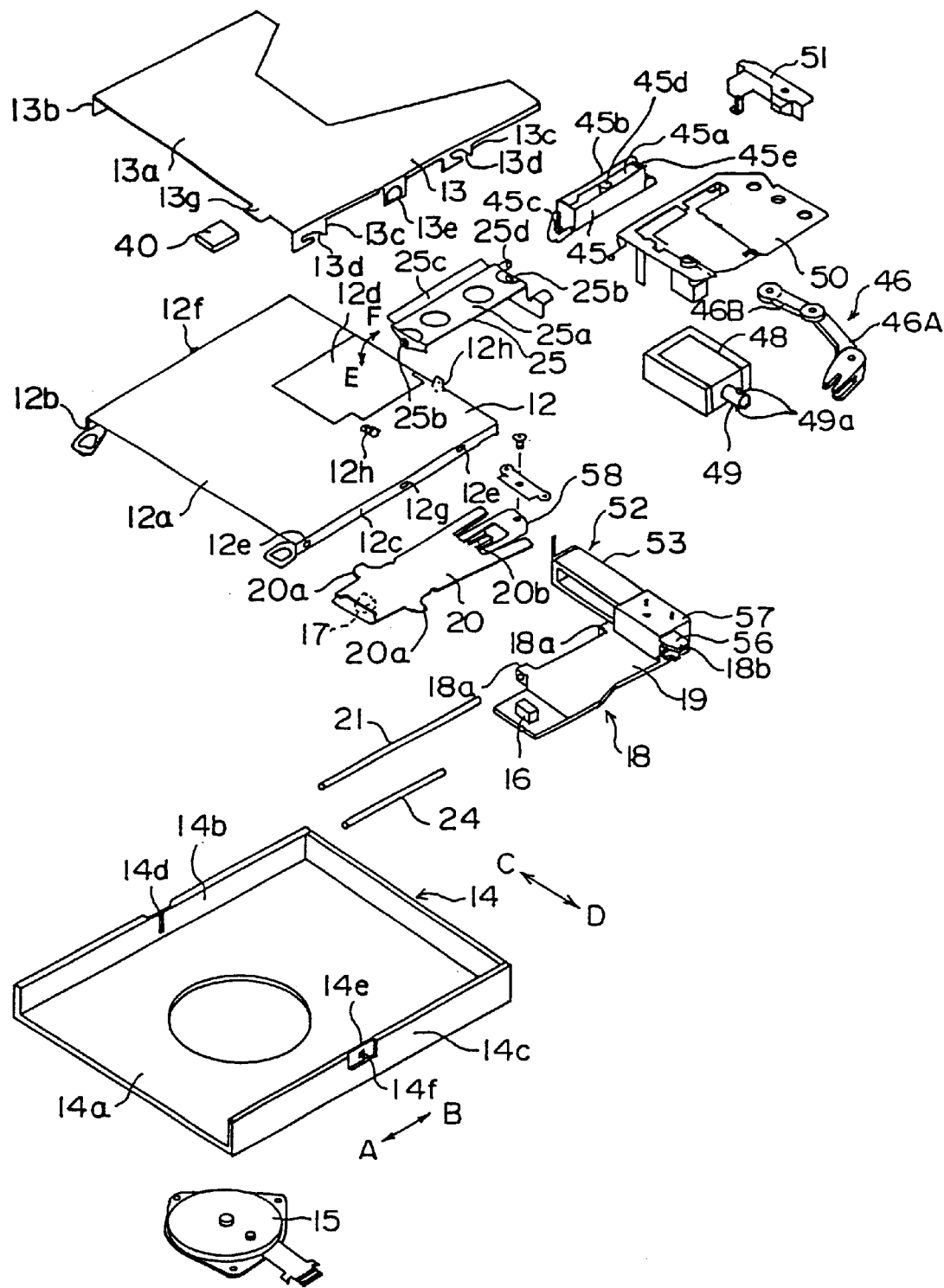
FIG. 2 shows an exploded perspective view showing a general arrangement of the magnetic disk device.

FIG. 1 shows a plan view of a magnetic disk device 11 in one embodiment of the recording-medium recording/reproducing device according to the present invention. FIG. 2 shows an exploded perspective view showing a general arrangement of the magnetic disk device 11.

As shown in FIGS. 1 and 2, in the magnetic disk device 1, a disk holder 12, in which a disk cartridge (not shown in the figures) is inserted, and a slider (sliding member) 13, which slides forward and backward so as to raise and lower the disk holder 12, are mounted on a frame 14. The slider 13 is provided on the frame 14 slidably in A, B directions, and, in response to the operation of inserting the disk-cartridge, the slider 13 slides in the A direction so as to lower the disk holder 12 from a cartridge insertion/ejection position to a cartridge loaded position.

A turntable 15, which is driven by a disk motor (not shown in the figure) for rotating a magnetic disk, and a head carriage 18, which supports magnetic heads 16, 17, are provided so as to project from the surface 14a of the frame 14. A circuit substrate (not shown in the figures) having a control circuit is mounted on the underside of the frame 14.

The head carriage 18 has a carriage body 19 which supports the lower magnetic head 16 on a top surface of an extending end thereof, and a head arm 20 which supports the upper magnetic head 17 on a bottom surface of an extending end thereof and is rotatably mounted on the carriage body 19.

The head carriage 18 is guided by guiding shafts 21, 24 which extend in the forward/backward directions (A, B directions) so as to be movable in the forward/backward directions. Bearing portions 18a, 18b, into which the guiding shafts 21, 24 are slidably fitted, respectively, are provided on the right and left side surfaces of the head carriage 18, respectively.

The bearing portion 18a includes a circular hole through which the main guiding shaft 21 passes, and is a main bearing which determines the movement directions, the horizontal position and the vertical position of the head carriage 18. Further, the bearing portion 18b is a bearing having an angular-'C' shape, into which the guiding shaft 24 is fitted. Therefore, the bearing portion 18b does not determine the movement directions and horizontal position of the head carriage 18, but determines only the vertical position of the head carriage 18.

The head carriage 18 is guided by the guiding shafts 21 and 24 and moves in the A, B directions as a result of being driven by a voice coil motor (which will be described later). As a result, the magnetic heads 16, 17 supported by the head carriage 18 are in close proximity to desired tracks of the magnetic disk (not shown in the figures) contained in the disk cartridge. Thus, magnetic recording/reproducing is performed through the magnetic heads 16, 17.

A damper mechanism 31 is arranged on the underside of the slider 13. The damper mechanism 31 includes a damper plate (rotating member) 32 rotatably provided on the underside of the slider 13, and a torsion spring 33 (second force-applying member) which applies force to the damper plate 32. On the underside of the slider 13, a shaft 34, which rotatably supports the damper plate 32, and a hooking portion $13a_2$, to which one end of the torsion spring 33 is hooked, are provided. A long hole 32e, into which a pin 86 fixed on the frame 14 is fitted, is formed in the damper plate 32.

The damper plate 32 is rotatably supported by the shaft 34, which projects downward from a top plate 13a of the slider 13. When the slider 13 slides in the A, B directions, the relative positions of the pin 86 fixed on the frame 14 and the shaft 34 of the slider 13 change, and, thus, the sliding operation of the slider 13 is decelerated, as will be described later.

Thus, the damper mechanism 31 in the embodiment of the present invention is not an oil damper but is a mechanical damper mechanism using spring force to be applied to the slider 13 for decelerating the sliding operation of the slider 13.

Further, the damper mechanism 31 is arranged so that the damper mechanism 31 applies force to the slider 13 in the direction (B direction) reverse to the direction (A direction) in which the slider 13 moves, at the beginning of the movement thereof from the cartridge insertion/ejection position to the cartridge loaded position, and, then, after the damper plate 32 rotates a predetermined angle in the process in which the slider 13 slides, the damper mechanism 31 applies force to the slider 13 in the direction (A direction) in which the slider 13 moves.

Thereby, at the beginning of the disk-cartridge loading operation, the damper mechanism 31 decelerates the operation of the slider through the spring force of the torsion spring 33, and, thus, reduces the speed at which the disk holder 12 falls, that is, reduces the disk loading speed.

Further, before the disk cartridge reaches the cartridge loaded position together with the disk holder 12, the direction in which the torsion spring 33 of the damper mechanism 31 applies the force to the slider 13 is reversed due to rotation of the damper plate 32 so that the damper mechanism 31 applies the force to the slider 13 in the loading direction (A direction), and, thereby, holds the disk holder 12 in the cartridge loaded position after the disk cartridge reaches the cartridge loaded position.

Arrangements of the respective main components arranged as described above will now be described.

The disk holder 12 includes a top plate 12a, and cartridge guiding portions 12b, 12c which bend at both sides of the top plate 12a so as to hold the disk cartridge from both sides. Thus, the space enclosed by the top plate 12a and the cartridge guiding portions 12b, 12c of both sides is a cartridge inserting portion.

An opening 12d, in which the head carriage 18 moves, is provided in the top plate 12a of the disk holder 12. Further, a lifter 25, which comes into contact with a projection 20a projecting from one side of the head arm 20, is rotatably provided on the right side of the opening 12d. Thereby, the magnetic head 17 of the head arm 20 is lifted and lowered intermittently in response to the rising and falling operations of the disk holder 12. Thus, a head moving mechanism is formed by the disk holder 12, the head arm 20, the lifter 25 and so forth.

The lifter 25 is supported on the disk holder 12 as a result of shafts 25b projecting from both sides of a body 25a of the lifter 25 being supported by supporting portions 12h which stand on the top plate 12a of the disk holder 12. Thus, the lifter 25 can rotate in the E, F directions perpendicular to the carriage moving directions (A, B directions).

Further, on each of both sides of the disk holder 12, a pair of engagement pins 12e which engage with the slider 13 are provided. From the centers of both sides of the disk holder 12, guiding portions 12f, 12g project, respectively. The guiding portions 12f, 12g are fitted into guiding cut-out portions 14d, 14e provided in side walls 14b, 14c of the frame 14, and, thereby, the rising and falling operations of the disk holder 12 are guided.

As will be described later, in response to the rising and falling operations of the disk holder 12, a contact portion 25c of the lifter 25 provided on the top plate 12a of the disk holder 12 comes into contact with the projection 20a of the head arm 20, and the lifter 25 rotates so as to lower the head arm 20 stepwise. The contact portion 25c extends through the length corresponding to the length from the most inside track to the most outside track of the magnetic disk, that is, the length corresponding to the stroke of the head carriage 18.

The slider 13 is slidably mounted above the disk holder 12. The slider 13 includes a J-shaped plane plate (top plate) 13a, side portions 13b, 13c which bend downward from both sides of the plane plate 13a, inclined cut-out portions 13d which are provided in the side portions 13b, 13c and into which the engagement pins 12e of the disk holder 12 are fitted, respectively, and engagement holes 13e which engage with projections 14f projecting from the centers of both side surfaces of the frame 14, respectively. Further, the slider 13 includes a projection 13g which projects from the right side of the front end of the slider 13. An ejecting button 40 is fixed to the projection 13g. Further, a force is applied to the slider 13 in the A direction by a coil spring 41.

Figure 3:
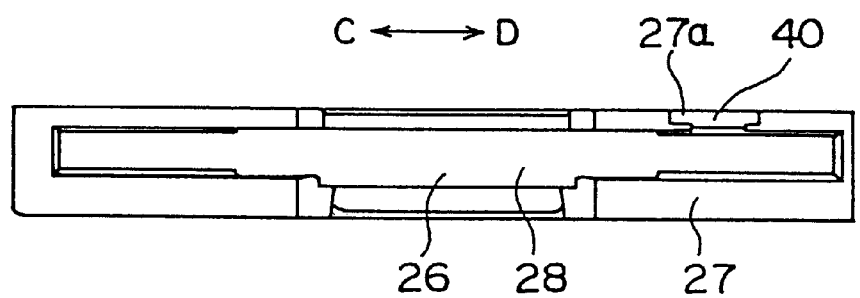
FIG. 3 shows a front elevational view of the magnetic disk device.

FIG. 3 shows a front elevational view of the magnetic disk device 11.

As shown in FIG. 3, a front bezel 27 having a disk inserting hole 26 is mounted on the front end of the frame 14. On the right side of a top end portion of the bezel 27, a recess portion 27a into which the ejecting button 40 is slidably fitted is provided. On the rear side of the bezel 27, a flap 28 for covering the disk inserting hole 26 from the inside is mounted rotatably in opening and closing directions.

Figure 4:
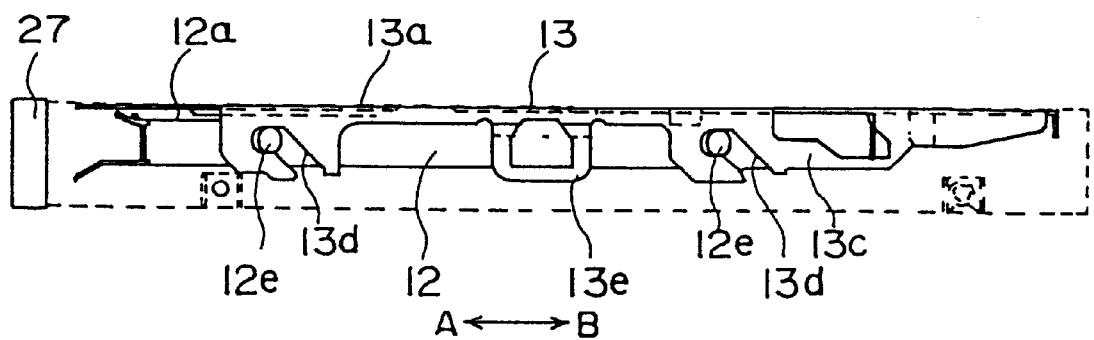
FIG. 4 shows a side elevational view showing a condition in which the disk holder and the slider are combined.

FIG. 4 shows a side elevational view showing a condition in which the disk holder 12 and the slider 13 are combined with one another.

As shown in FIG. 4, the engagement pins 12e of the disk holder 12 are fitted into the inclined cut-out portions 13d of the slider 13. Thereby, in response to the sliding operation of the slider 13, the engagement pins 12e are driven along the inclined cut-out portions 13d. Thereby, when the slider 13 slides in the B direction, the disk holder 12 rises to the cartridge insertion/ejection position. When the slider 13 slides in the A direction, the disk holder 12 falls to the cartridge loaded position. Thus, a recording medium conveying mechanism is formed by the disk holder 12 and the slider 13.

With reference to FIG. 1, a latch mechanism 36 includes a latch lever (latch member) 38 which is rotatably supported on the top surface of the top plate 12a of the disk holder 12, and the coil spring (first force-applying member) 41 which applies force to the latch lever 38 counterclockwise.

The latch lever 38 includes a lever portion 38a, acting as a to-be-pushed portion which is pushed by the disk cartridge which is inserted into the disk holder 12, and a movement-preventing portion 38b, which prevents the slider 13 from moving in the cartridge loading direction (A direction). The lever portion 38a rotates in response to the insertion and ejection of the disk cartridge, and opens and closes a shutter of the disk cartridge. An opening (not shown in FIG. 2) is provided in the top plate 12a of the disk holder. Through the opening, the lever portion 38a of the latch lever 38 projects inside the disk holder 12 so that the lever portion 38a can be pushed by the disk cartridge inserted into the disk holder 12.

One end of the coil spring 41 is fixed to a fixing hole 38e of the latch lever 38 and the other end of the coil spring 41 is fixed to a fixing portion 13i of the slider 13. As a result, the coil spring 41 applies force to the latch lever 38 by which the latch lever 38 rotates counterclockwise to be in a position such as to prevent movement of the slider 13, and applies force to the slider 13 by which the slider 13 moves in the cartridge loading direction (A direction).

Thus, the coil spring 41 acts as a slider returning spring for applying force to the slider 13 in the A direction, and, also, acts as a latch-lever returning spring for applying force to the latch lever 38 counterclockwise. As a result, in comparison to a case where a member which applies force to the latch lever 38 and a member which applies force to the slider 13 are provided separately, the assembly work can be simplified, work efficiency can be improved, and the manufacturing cost can be reduced.

In response to insertion of the disk cartridge into the disk holder 12, the latch lever 38 rotates clockwise as a result of being pushed by the front end of the disk cartridge. Then, when the arc-shaped movement-preventing portion 38b of the latch lever 38 separates from a movement-to-be-prevented portion 13h of the slider 13 as a result of the clockwise rotation of the latch lever 38, the slider 13, to which force is applied by the coil spring 41, slides in the A direction.

As a result of the latch lever 38 thus rotating, a projecting end portion 38c of the lever portion 38a pushes the shutter of the disk cartridge in the opening direction. Thereby, the magnetic heads 16, 17 can be in close proximity to the magnetic disk. When the ejecting button 40 is pressed in the B direction, and, thereby, the slider 13 slides in the same direction, movement prevention of the movement-preventing portion 38b, which movement prevention has been provided as a result of being in contact with a side surface of the movement-to-be-prevented portion 13h of the slider 13, is released. Thereby, the latch lever 38 rotates counterclockwise by the spring force of the coil spring 41.

As will be described later, a carriage stopper 45 acts as a locking member which prevents movement of the head carriage 18 at the time of ejection and in a waiting condition so as to prevent the magnetic heads 16, 17 from moving. A body 45a of the carriage stopper 45 is mounted so as to extend in the A, B directions so as to face the right side of the guiding shaft 24. The carriage stopper 45 is supported, by a bearing portion (not shown in the figure) formed on the frame 14, rotatably in the E, F directions, similar to the lifter 25.

FIGS. 5A, 5B, 5C, 5D and 5E show an arrangement of the carriage stopper 45. The carriage stopper 45 includes a rack 45b which is provided on one-side surface of the body 45a and prevents the head carriage 18 from moving, a V-shaped recess portion 45c with which an engagement pin 25d projecting from an end portion of the lifter 25 engages, a connection pin 45d which projects on a top portion of the other-side surface of the body 45a, and a shaft 45e about which the carriage stopper 45 rotates.

Further, as shown in FIG. 2, a movable rack 56 which faces the rack 45b is provided on the right-side surface of the head carriage 18. The rack 45b extends through the length corresponding to the length from the most inside track to the most outside track of the magnetic disk, that is, the length corresponding to the stroke of the head carriage 18. Therefore, when the carriage stopper 45 rotates in the E direction, the rack 45b engages with the movable rack 56, and, thus, the carriage stopper 45 locks the head carriage 18.

A link mechanism 46 is connected with the carriage stopper 45. In the link mechanism 46, a first link 46A and a second link 46B are rotatably connected with one another.

Figure 6B:
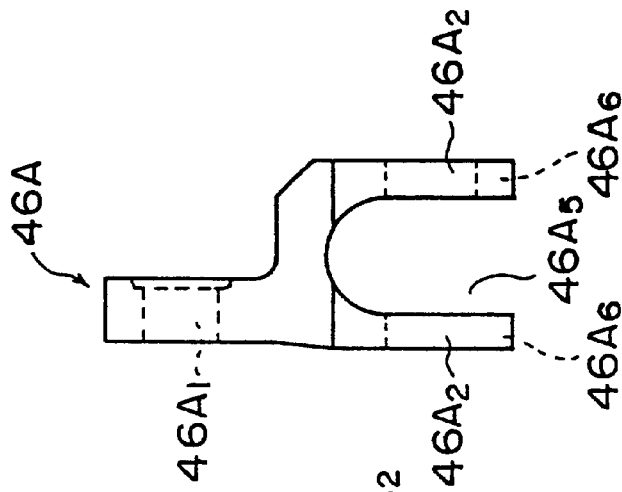
FIGS. 6A, 6B and 6C show an arrangement of a first link.
Figure 6A:
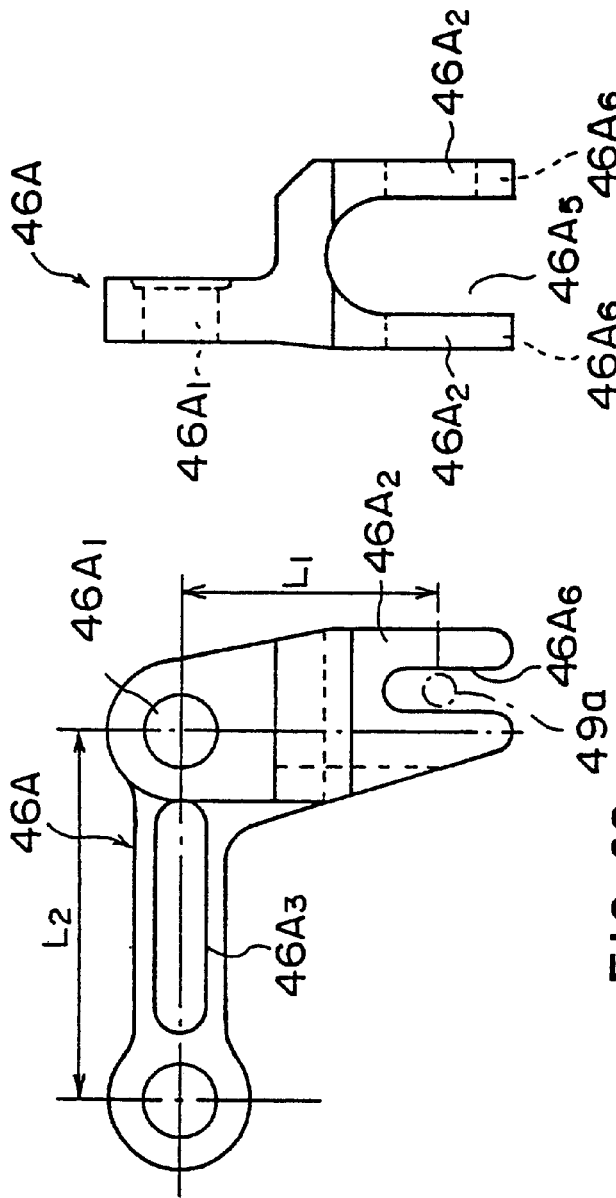
Figure 6C:
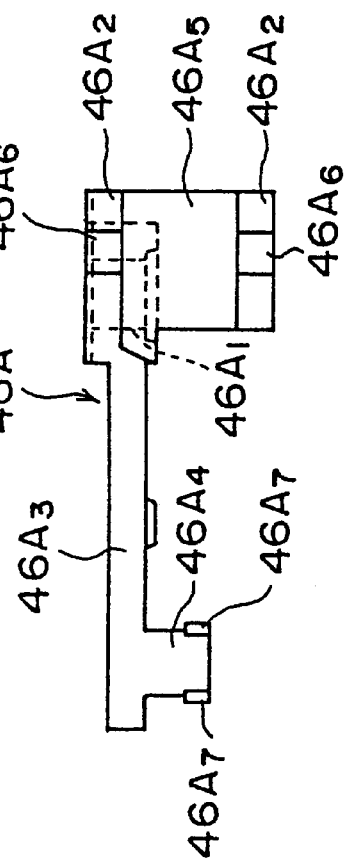

FIGS. 6A, 6B and 6C show an arrangement of the first link 46A.

As shown in FIGS. 6A, 6B and 6C, the first link 46A is formed to be L-shaped in the plan view (FIG. 6A). The first link 46A has a shaft hole $46A_1$. A shaft 76 (see FIG. 16) standing on the frame 14 is fitted into the shaft hole $46a_1$, so that the first link 46A is rotatably supported on the frame 14. The first link 46A further has an engagement arm $46A_2$ which engages with a plunger 49 of a solenoid 48 which will be described later. The first link 46A further has a connection arm $46A_3$ which extends in a direction perpendicular to the engagement arm $46A_2$, and a connection shaft $46A_4$ which is provided at an end portion of the connection arm $46A_3$ and is connected with the second link 46B.

Further, in the first link 46A, the distance $L_1$ between the center of the shaft hole $46A_1$ and the position at which the engagement arm $46A_2$ engages with the plunger 49 and the distance $L_2$ between the center of the shaft hole $46A_1$ and the center of the connection shaft $46A_4$ are set so that $L_1<L_2$. Thereby, when the first link 46A is rotated as a result of movement of the plunger 49, the connection shaft $46A_4$ moves a longer distance in comparison to the stroke of the plunger 49. Thereby, when the locking of the head carriage 18 is released, it is possible to move the carriage stopper 45 to a locking releasing position by the small stroke of the plunger 49.

The engagement arm 46A$_2$ has a space 46A$_5$ into which the plunger 49 is inserted, has a forked shape extending so as to face a top portion and a bottom portion of the plunger 49, and has engagement cut-out portions 46A$_6$ with which engagement pins 49a projecting upward and downward from the plunger 49 engage. Further, at the bottom end of the connection shaft 46A$_4$, separation-preventing claws 46A$_7$ project in radial directions.

Figure 7A:
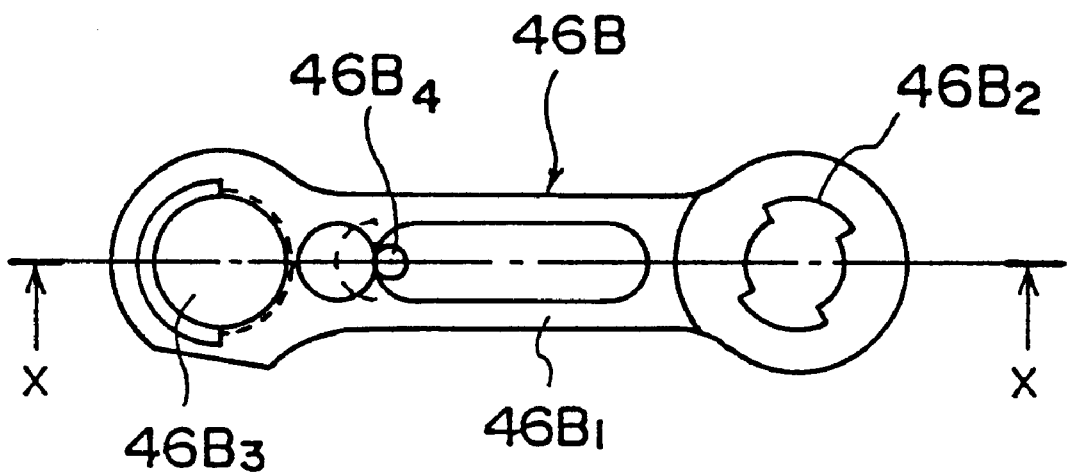
FIGS. 7A and 7B show an arrangement of a second link.
Figure 7B:
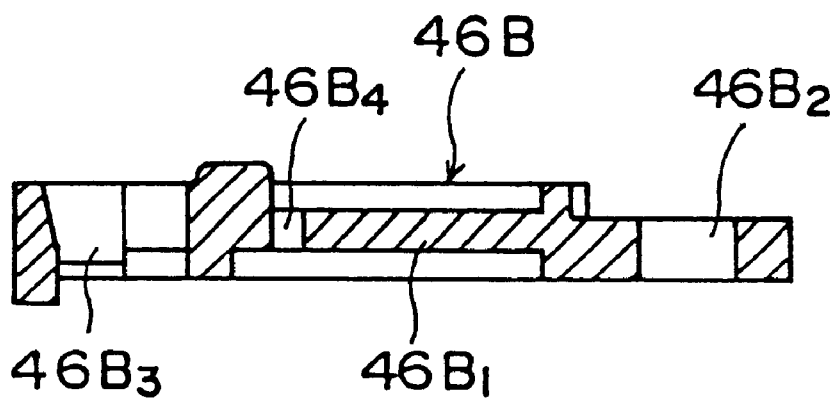

FIG. 7A shows a plan view of the second link 46B. FIG. 7B shows a side-elevational sectional view of the second link 46B.

As shown in FIGS. 7A, 7B, the second link 46B has a connection hole 46B$_2$ at one end of a rod portion 46B$_1$ extending straightly. The connection hole 46B$_2$ is connected with the first link 46A. Further, the second link 46B has a fitting hole 46B$_3$ at the other end of the rod portion 46B$_1$. The connection pin 45d of the carriage stopper 45 is fitted into the fitting hole 46B$_3$. Further, the second link 46B has a spring-hooking hole 46B$_4$ provided in the proximity of the fitting hole 46B$_3$. The connection hole 46B$_2$ has a shape of a circle with a pair of sector escaping portions formed in the sidewall of the circular hole. The sector escaping portions have shapes corresponding to the projecting shapes of the separation-preventing claws 46A$_7$ of the first link 46A.

Figure 8A:
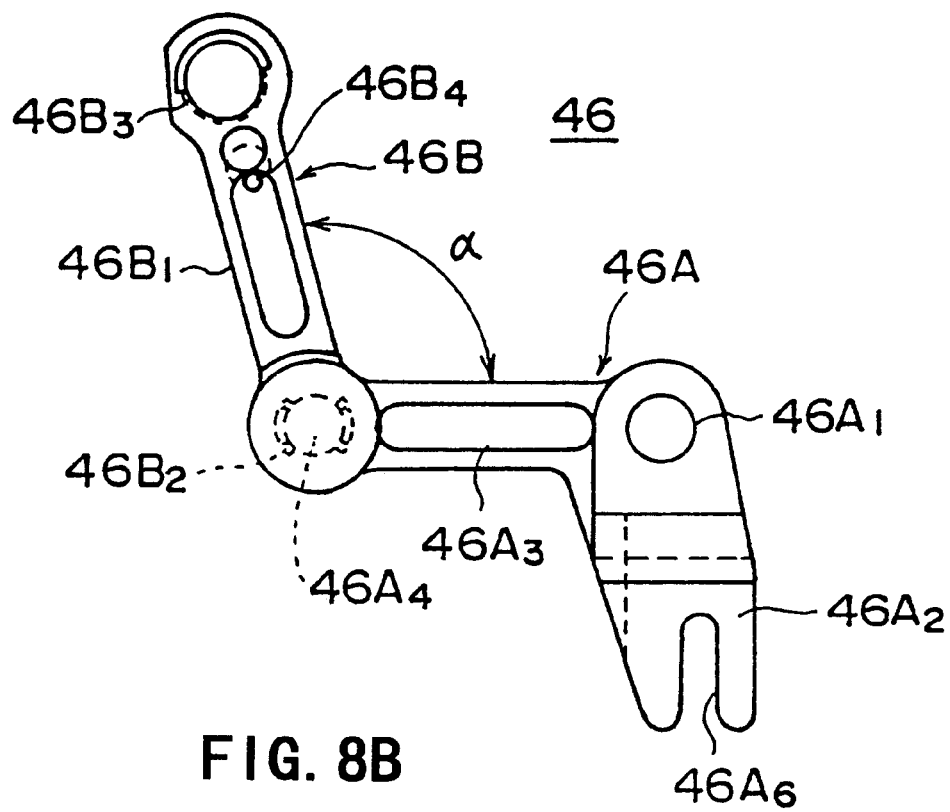
FIGS. 8A and 8B illustrates a process of connecting the first link with the second link.
Figure 8B:
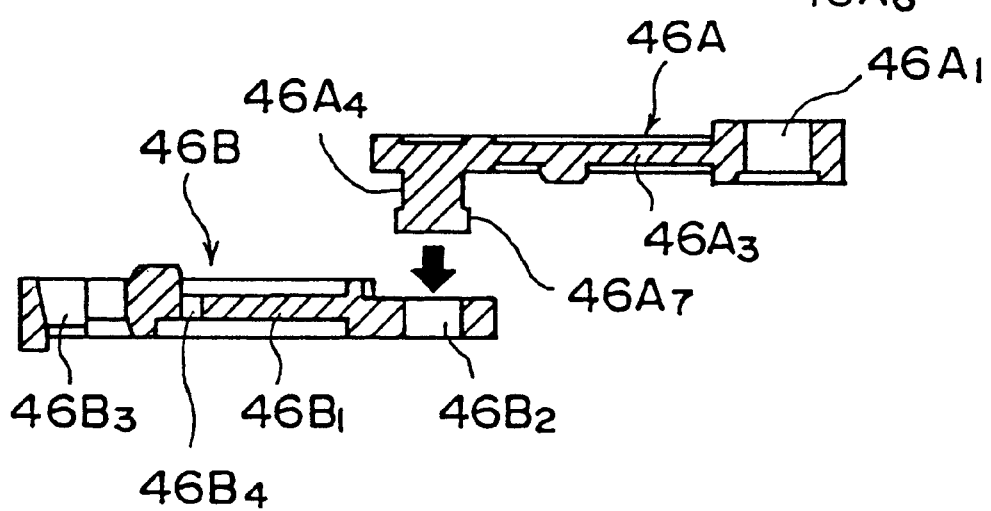

FIG. 8A shows a plan view illustrating a process of connecting the first link 46A with the second link 46B. FIG. 8B shows a side-elevational sectional view illustrating the process of connecting the first link 46A with the second link 46B.

As shown in FIGS. 8A, 8B, when the first link 46A and the second link 46B are connected with one another, the connection shaft 46A$_4$ of the first link 46A is fitted into the connection hole 46B$_2$ of the second link 46B so that the separation-preventing claws 46A$_7$ projecting at the bottom of the connection shaft 46A$_4$ are aligned with the shape of the connection hole 46B$_2$ in a condition in which the second link 46B has rotated by the angle (approximately 100°) with respect to the first link 46A. Then, as a result of rotating the first link 46A with respect to the second link 46B after the connection shaft 46A$_4$ is fitted into the connection hole 46B$_2$, the separation-preventing claws 46A$_7$ are prevented from separating from the connection hole 46B$_2$.

Figure 9A:
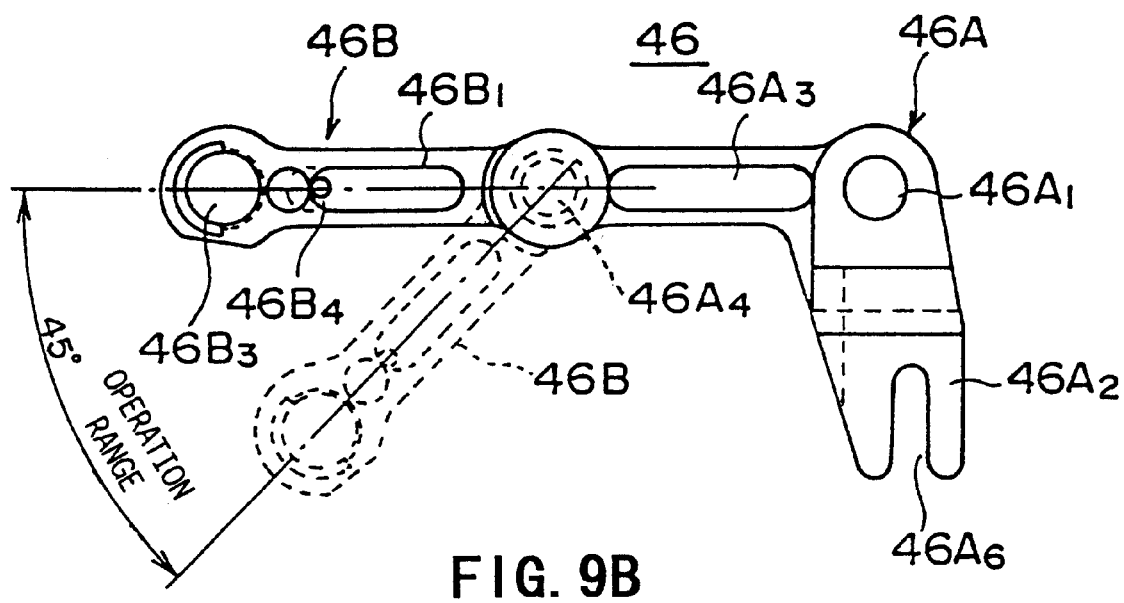
FIGS. 9A and 9B illustrate a condition in which the first link and the second link are connected with one another.
Figure 9B:
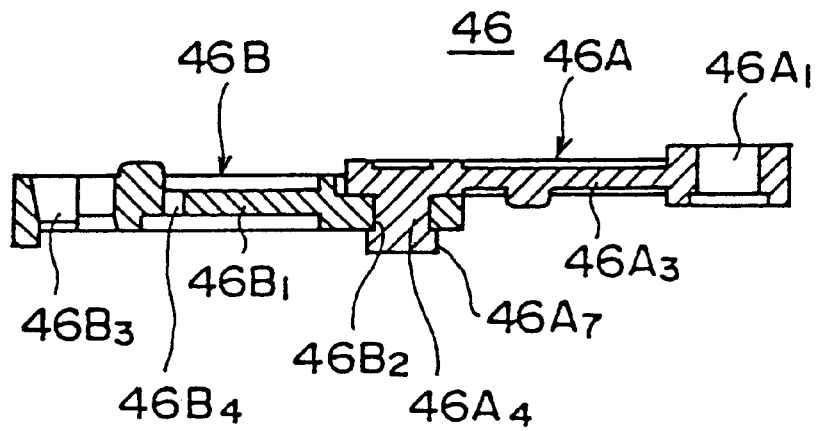

FIG. 9A shows a plan view illustrating a condition in which the first link 46A and the second link 46B are connected with one another. FIG. 9B shows a side-elevational sectional view illustrating the condition in which the first link 46A and the second link 46B are connected with one another.

As shown in FIGS. 9A, 9B, after the first link 46A and the second link 46B are connected with one another, the link mechanism 46 is assembled in the device so that rotation is possible in a range between a straightly extending condition in which the first link 46A and the second link 46B connected with one another extend straightly and a bent condition in which the second link 46B is in the position indicated by the broken lines in FIG. 9A.

Figure 16:
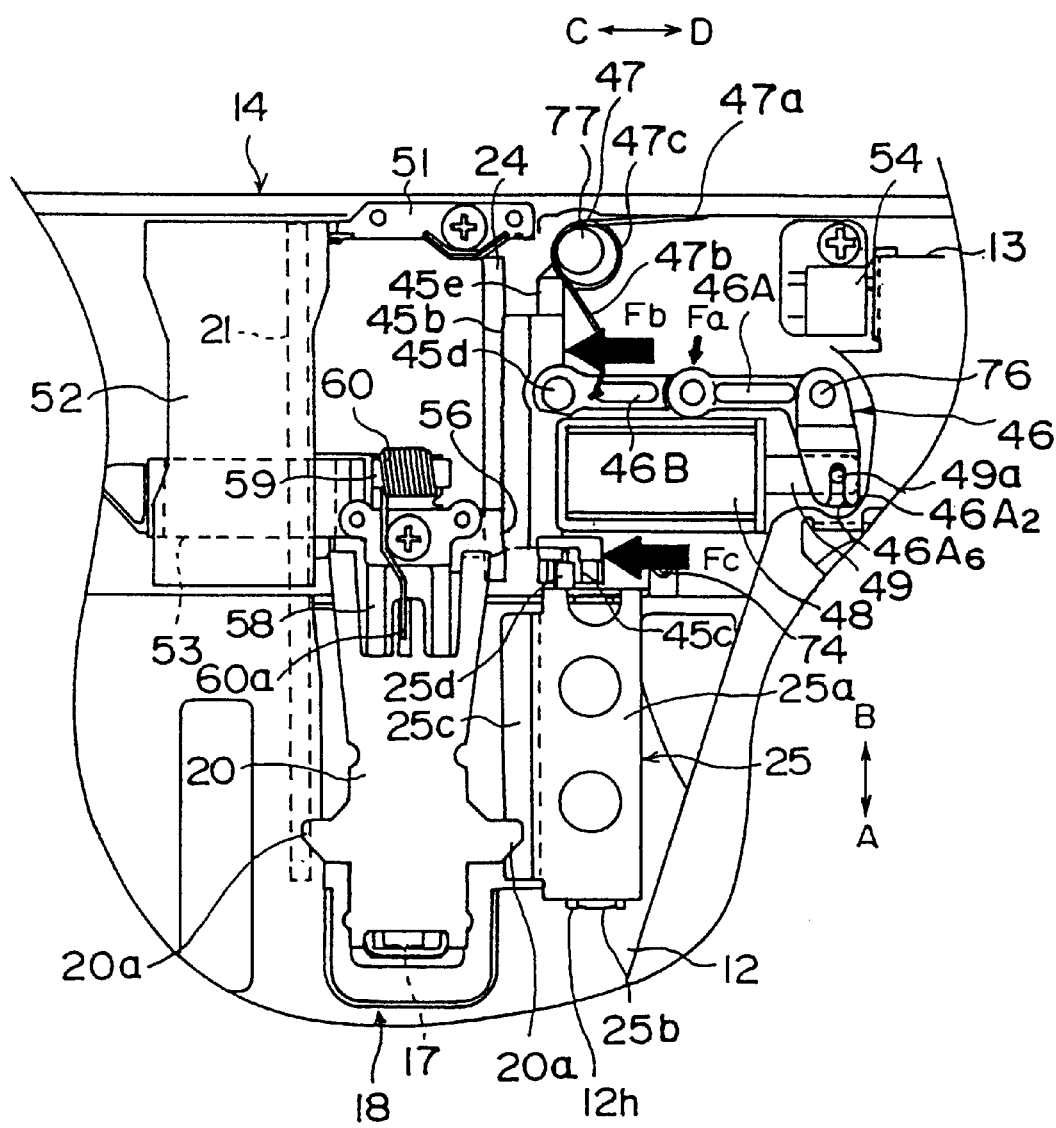
FIG. 16 shows a magnified plan view showing a head carriage and a periphery thereof in an ejecting mode.

Further, as shown in FIG. 16, spring force of a torsion spring 47 is applied to the second link 46B so that the link mechanism 46 enters the straightly extending condition. One end 47a of the torsion spring 47 is hooked to a rear end portion of the frame 14, and the other end 47b of the torsion spring 47 is hooked to the spring-hooking hole 46B$_4$ of the second link 46B. As a result, the link mechanism 46 is maintained in the straightly extending condition by the spring force of the torsion spring 47, and, thereby, the link mechanism 46 pushes the carriage stopper 45 in the direction toward the head carriage 18.

The other end 47b of the torsion spring 47 is bent so that the torsion spring 47 pushes the spring-hooking hole 46B$_4$ in the direction toward the carriage stopper 45. A coil portion 47c of the torsion spring 47 is fitted around a cylindrical projecting pin 77 projecting on the frame 14.

Figure 10C:
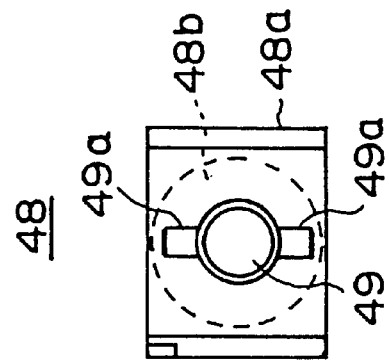
FIGS. 10A, 10B and 10C show an arrangement of a solenoid.
Figure 10A:
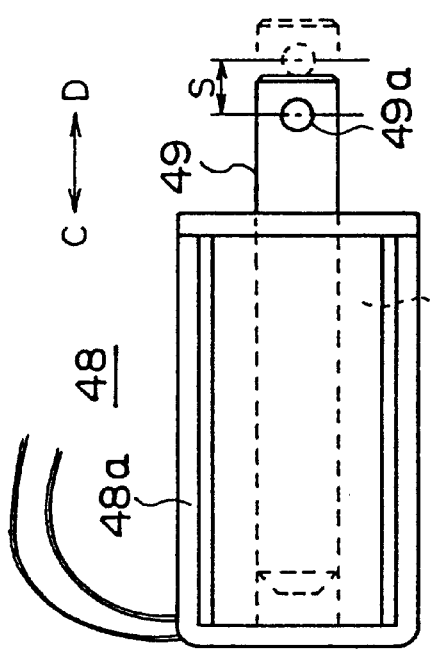
Figure 10B:
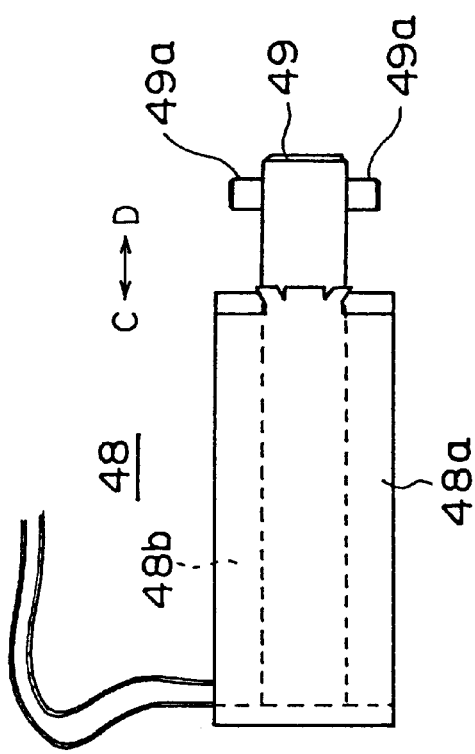

FIG. 10A shows a plan view illustrating an arrangement of the solenoid 48. FIG. 10B shows a front elevational view illustrating the arrangement of the solenoid 48. FIG. 10C shows a side elevational view illustrating the arrangement of the solenoid 48.

As shown in FIGS. 10A, 10B, 10C, the solenoid 48 includes a case 48a, a hollowly wound coil 48b contained in the case 48a, and the plunger 49 which is slidably inserted into the coil 48b. The plunger 49 has the engagement pins 49a projecting in the upward and downward directions perpendicular to the axis direction of the plunger 49 at an end portion of the plunger 49 projecting from the coil 48b.

When the solenoid 48 is energized in accordance with instructions given by the control circuit (not shown in the figures), the coil 48b is energized and attracts the plunger 49 in the C direction. The engagement pins 49a provided at the end portion of the plunger 49 engage with the first link 46A of the link mechanism 46. Therefore, when the solenoid 48 is energized and the plunger 49 is attracted in the C direction, the first link 46A of the link mechanism 46 rotates clockwise, that is, rotates in the carriage-movement-prevention releasing direction.

When the solenoid 48 is not energized because of the failure of the power supply or the like, the plunger 49 returns in the D direction due to the spring force of the torsion spring 47. At this time, the first link 46A rotates counterclockwise, that is, rotates in the carriage-movement-preventing direction. The stroke S of the plunger 49 of the solenoid 48 in the embodiment, which stroke is the range in which the plunger 49 can slide, is set to be small.

The stroke S which is the range in which the plunger can slide is so small that the attracting force of the coil 48b can effectively affect the plunger 49. Therefore, it is not necessary to increase the attracting force of the coil 48b so as to increase the range in which the plunger 49 can slide. As a result, it is possible to miniaturize the solenoid 48, and thereby, save a setting space.

In FIG. 2, a holding member 50 is formed of a sheet metal so that the guiding shaft 24, the link mechanism 46, the solenoid 48, and the torsion spring 47 are held from the top as a result of the holding member 50 being fixed to the frame 14.

In FIGS. 1, 2, a guiding-shaft pushing member 51 is fixed to the frame 14 in a condition in which an end portion of the guiding shaft 21 is pushed in the C direction perpendicular to the axis direction of the guiding shaft 21.

In a voice-coil motor 52, a magnet (not shown in the figure) is arranged on the frame 14, and a coil 53 is integrally provided on the left side surface of the head carriage 18. The voice-coil motor 52 is provided at the left side of the guiding shaft 21 which is disposed in proximity to the center of gravity of the head carriage 18. As a result, the head carriage 18 is driven in the A, B directions by the single voice-coil motor 52, and, thereby, the magnetic heads 16, 17 can perform a seeking operation. Therefore, in comparison to a case where a pair of voice-coil motors are provided on both sides of the head carriage, the head carriage is miniaturized, the moving space of the head carriage is reduced, and it is possible to miniaturize the magnetic disk device 11.

With reference to FIGS. 11 through 15, the damper mechanism 31 which decelerates the sliding operation of the slider 13 when the disk cartridge is inserted into the disk holder 12 will now be described in detail.

Figure 11:
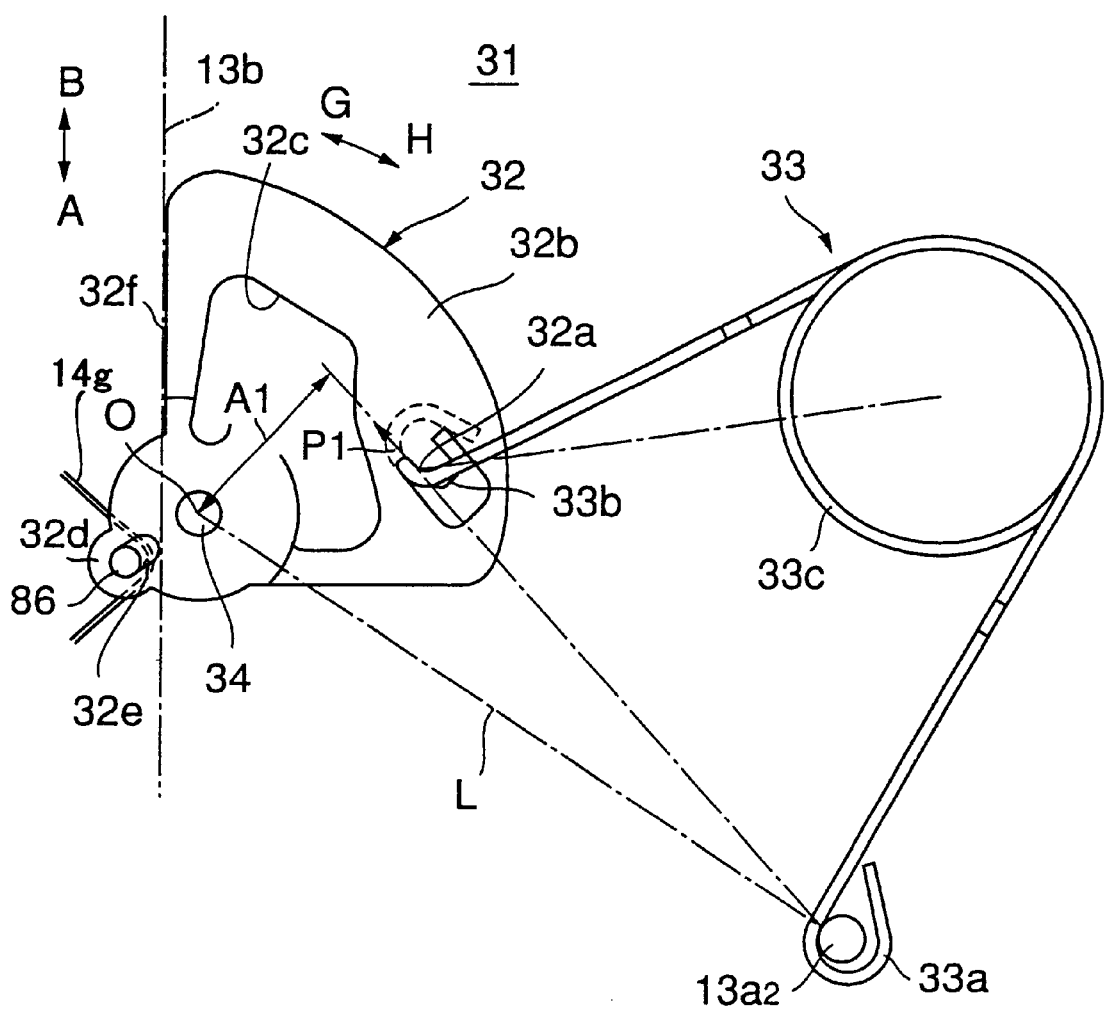
FIG. 11 shows a plan view showing a condition, in which a damper plate and a torsion spring are mounted, before the disk cartridge is inserted.

FIG. 11 shows a plan view showing a condition, in which the damper plate 32 and the torsion spring 33 are mounted, before the disk cartridge is inserted.

As shown in FIG. 11, the damper plate 32 of the damper mechanism 31 is rotatably supported by the shaft 34 projecting downward from the top plate 13a of the slider 13. A hooking portion 32a to which one end of the torsion spring 33 is hooked is formed in a sector portion 32b as a result of being cut and bent. An opening 32c is formed at a central portion of the sector portion 32b.

The long hole 32e is formed in a projection 32d projecting opposite to the sector portion 32b, into which long hole 32e a pin 86 provided on a supporting portion 14g of the frame 14 is fitted. Therefore, as a result of the slider 13 sliding in the A, B directions, the relative positions of the pin 86 fixed to the frame 14 and the shaft 34 of the slider 13 change.

Thus, the damper plate 32 rotates. As a result of the damper plate 32 rotating, the relative positions of the hooking portion $13a_2$ of the slider 13 and the hooking portion 32a of the damper plate 32 to which both ends of the torsion spring 33 are hooked, respectively, change. As a result, the direction in which the spring force of the torsion spring 33 is applied to the slider 13 changes.

In order to provide the damper plate 32 and the torsion spring 33 in a gap between the disk holder 12 and the slider 13, the projection 32d and the hooking portion 32a are bent downward.

Before the disk cartridge is inserted into the disk holder 12, as shown in FIG. 11, with respect to the reference line L connecting between the end 33a of the torsion spring 33 and the shaft 34 which is the rotation center O of the damper plate 32, the position at which the other end 33b of the torsion spring 33 is hooked is located in the B direction opposite to the A direction in which the slider 13 slides when the disk cartridge is inserted into the disk holder 12.

Therefore, the pushing force P1 of the torsion spring 33 is applied to the damper plate 32 so as to rotate the damper plate 32 in the G direction. Then, a side portion 32f of the sector portion 32b of the damper plate 32 stops its movement immediately before coming into contact with the side portion 13b of the slider 13.

In this condition, the pushing force P1 of the torsion spring 33 is applied in the direction different by the distance A1 from the rotation center O. As a result, the torsion spring 33 pushes the hooking portion 32a of the damper plate 32 in the G direction. Therefore, the damper plate 32 pushes the pin 86 which is fitted into the long hole 32e in the A direction. As a result, the damper plate 32 is pushed in the B direction due to the reaction force from the pin 86.

Due to the reaction force from the pin 86, via the damper plate 32, the slider 13 is pushed in the B direction opposite to the A direction in which the slider 13 slides when the disk cartridge is inserted into the disk holder 12. Thereby, at the beginning of the sliding operation performed when the disk cartridge is inserted into the disk holder 12, the slider 13 is pushed in the B direction, and the sliding operation of the slider 13 is decelerated.

Figure 12:
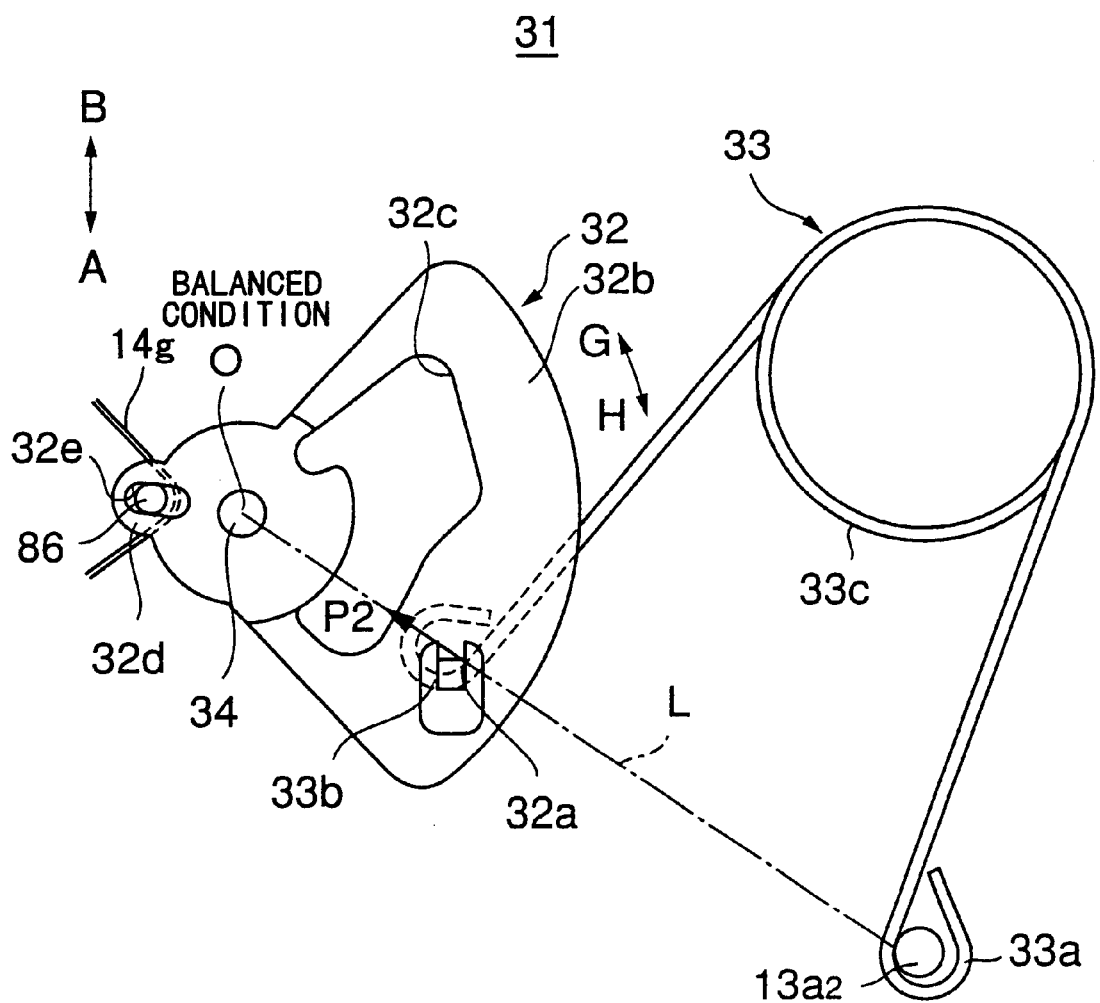
FIG. 12 shows a plan view showing a condition in which a position at which one end of the torsion spring is hooked, a position at which the other end of the torsion spring is hooked, and the rotation center of the damper plate are aligned straightly.

FIG. 12 shows a condition in which the position at which the end 33a of the torsion spring 33 is hooked, the position at which the other end 33b of the torsion spring 33 is hooked, and the rotation center O of the damper plate 32 are aligned straightly.

As shown in FIG. 12, as a result of the disk cartridge being inserted into the disk holder 12, the slider 13 slides a predetermined distance while the slider is decelerated. Then, as a result of the relative positions of the pin 86 fixed to the frame 14 and the shaft 34 of the slider 13 changing, the damper plate 32 rotates in the H direction. As a result of the damper plate 32 rotating in the H direction, as shown in FIG. 12, the respective points of the end 33a, the other end 33b of the torsion spring 33 and the shaft 34 are aligned on the reference line L momentarily.

In this condition, the pushing force P2 of the torsion spring 33 is applied in the direction toward the rotation center O of the damper plate 32. As a result, the force applied to the damper plate 32 is balanced. Thus, the force applied to the damper plate 32 in the B direction gradually decreases while the damper plate 32 rotates in the H direction.

Figure 13:
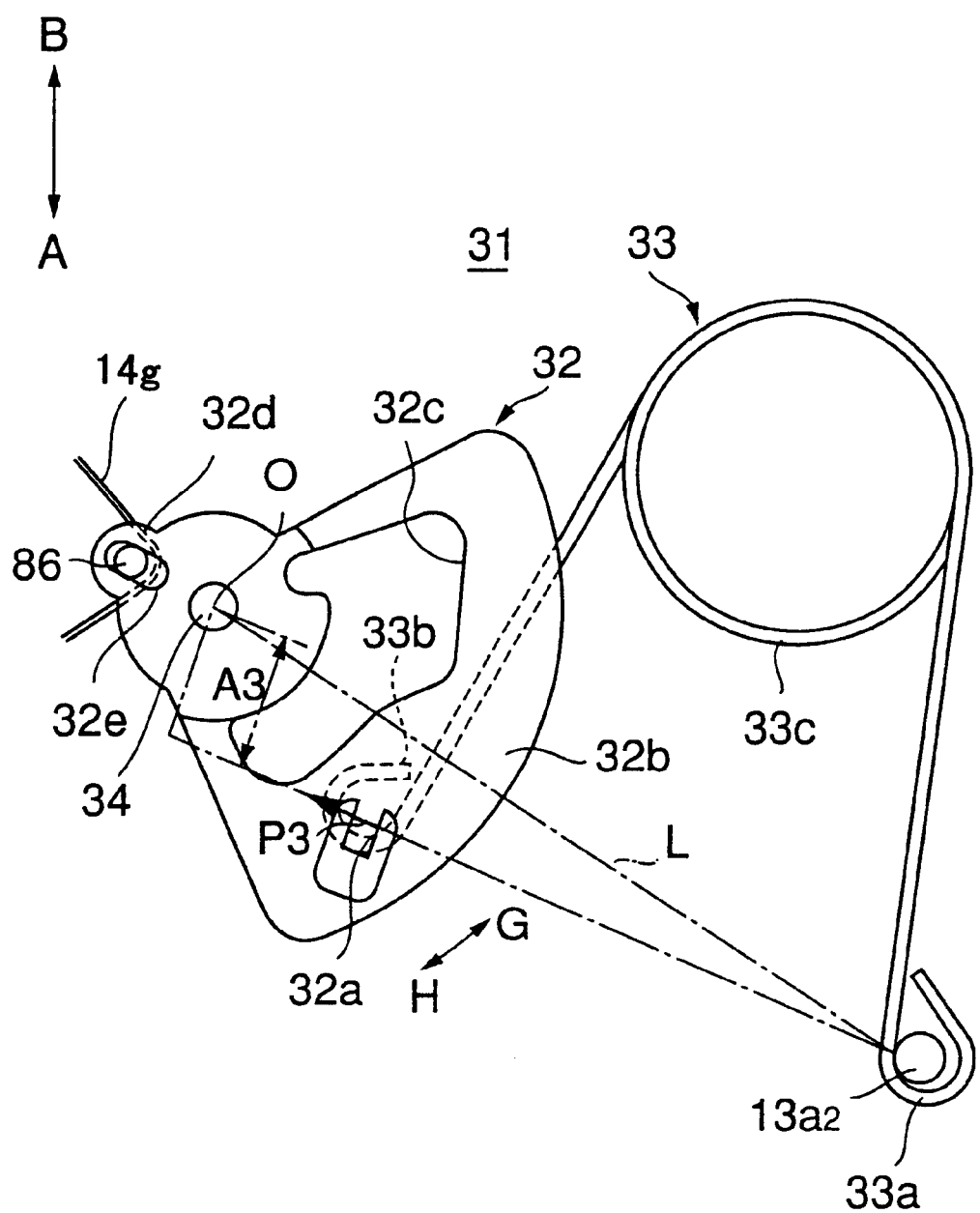
FIG. 13 shows a plan view showing a condition of a damper mechanism when a disk cartridge is loaded.

FIG. 13 shows a plan view showing the condition of the damper mechanism 31 when the disk cartridge is loaded.

The disk-cartridge inserting operation continues after the balanced condition shown in FIG. 12 is reached. As a result, as shown in FIG. 13, the position at which the end 33b of the torsion spring 33 is hooked is located in the A direction with respect to the reference line L.

In this condition, because the pushing force P3 of the torsion spring 33 is applied in the direction different in the A direction by the distance A3 from the rotation center O of the damper plate 32, the pushing force P3 of the torsion spring 33 is applied to the damper plate 32 such as to rotate the damper plate 32 in the H direction. Then, the damper plate 32 stops when the disk holder 12 falls to the cartridge loaded position and the slider 13 stops.

In this condition, the damper plate 32 pushes the pin 86 in the H direction. Thereby, the shaft 34 which supports the damper plate 32 is pushed in the A direction due to the reaction force from the pin 86.

Thus, the slider 13 is pushed in the direction (A direction) in which the slider 13 slides when the disk cartridge is inserted into the disk holder 12, via the damper plate 32 due to the reaction force from the pin 86. Thereby, immediately before the disk cartridge is loaded in the disk holder 12, the slider 13 is pushed in the A direction, and the sliding operation is accelerated.

As a result, the disk holder 12 is positively lowered to the disk cartridge loaded position, and the magnetic disk contained in the disk cartridge inserted into the disk holder 12 is positively loaded on the turntable 15.

Figure 14:
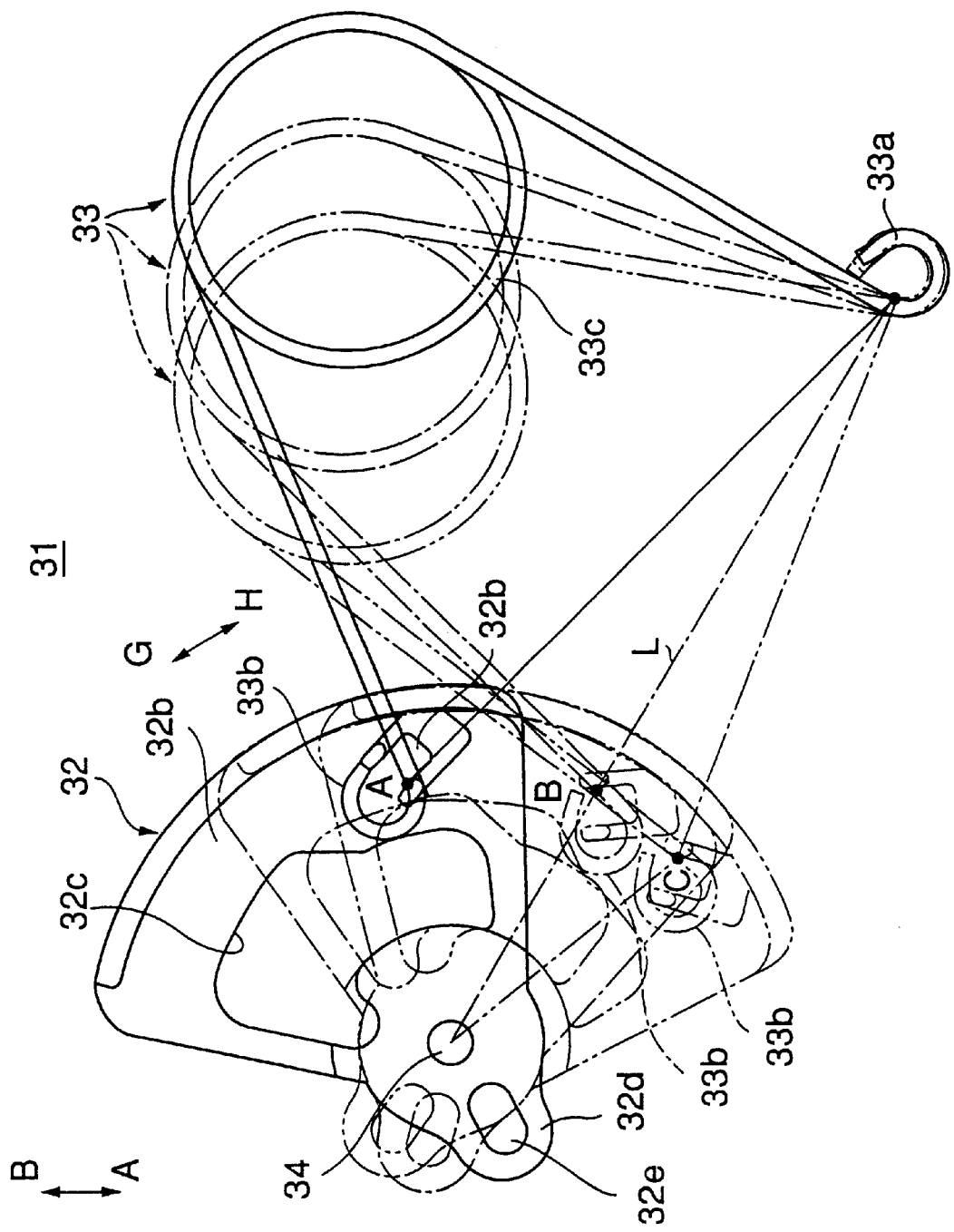
FIG. 14 shows a plan view illustrating a sequential transition of positions of the damper plate and the torsion spring.

FIG. 14 shows a plan view illustrating the above-described sequential transition of the positions of the damper plate 32 and the torsion spring 33.

In FIG. 14, for the sake of simplification of description, it is indicated that the damper plate 32 rotates about the shaft 34 and the torsion spring 33 rotates about the end 33a. However, actually, as a result of the slider 13 sliding, the pin 34 and the end 33a of the torsion spring 33 move. The position at which the end 33b of the torsion spring 33 is hooked to the hooking portion 32a of the damper plate 32 moves from the point A, to the point B and then to the point C during the process of the sliding operation of the slider 13 performed as a result of the disk cartridge being inserted into the disk holder 12.

Thereby, the reaction force resulting from the application of the spring force by the torsion spring 33 decelerates the sliding operation of the slider 13 during a time period. This time period starts before the disk cartridge is inserted into the disk holder 12 and the position at which the end 33b of the torsion spring 33 is hooked to the hooking portion 32a of the damper plate 32 is located at the point A. Then, this time period ends when the disk cartridge is inserted into the disk holder 12 and the position at which the end 33b of the torsion spring 33 is hooked to the hooking portion 32a of the damper plate 32 is located at the point B. At the time, the condition of the damper mechanism 31 is the balanced condition shown in FIG. 12. Then the reaction force resulting from the application of the spring force by the torsion spring 33 accelerates the sliding operation of the slider 13 during a time period. This time period starts when the position at which the end 33b of the torsion spring 33 is hooked to the hooking portion 32a of the damper plate 32 is located at the point B. Then, the time period ends when the position at which the end 33b of the torsion spring 33 is hooked to the hooking portion 32a of the damper plate 32 is located at the point C.

Further, as shown in FIG. 14, in the embodiment, the damper mechanism 31 is arranged so that the distance between the points A and B of the position at which the end 33b of the torsion spring 33 is hooked to the hooking portion 32a of the damper plate 32 is longer than the distance between the points B and C of the position at which the end 33b of the torsion spring 33 is hooked to the hooking portion 32a of the damper plate 32. Further, the torsion spring 33 first decelerates, and, then, accelerates the sliding operation of the slider 13, in the process in which the slider slides in the A direction as a result of the disk cartridge being inserted into the disk holder 12. The operation of the torsion spring 33 can be changed from the deceleration operation into the acceleration operation continuously.

Figure 15:
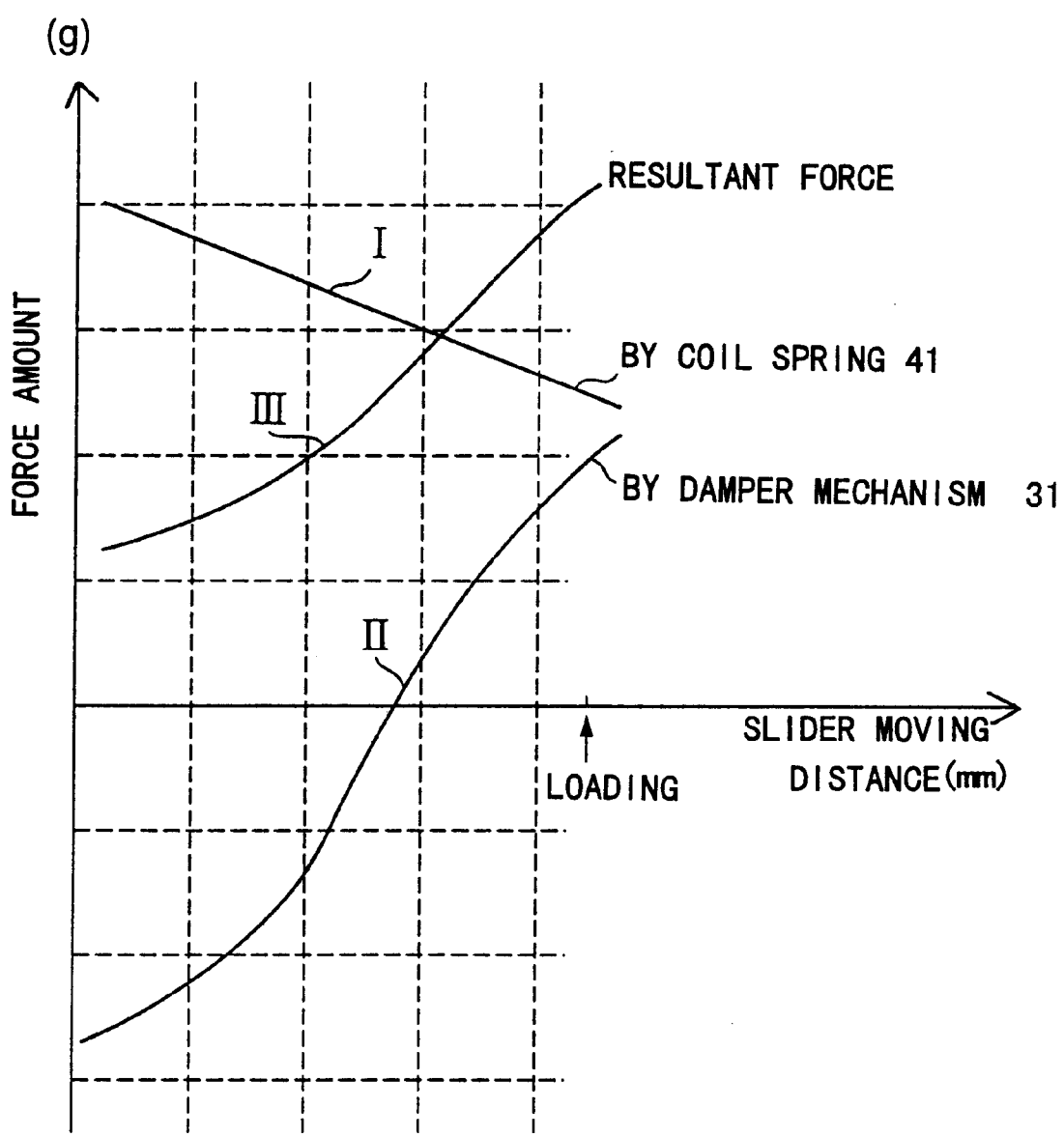
FIG. 15 shows how force applied to a slider changes when a sliding distance of the slider changes.

FIG. 15 shows how the force applied to the slider 13 changes when the sliding distance of the slider 13 changes. The curve I shown in FIG. 15 indicates the amount of the spring force of the coil spring 41 shown in FIG. 1 applied to the slider 13. The curve II indicates the amount of the spring force (the reaction force from the pin 86 of the frame 14) of the torsion spring 33 of the damper mechanism 31. The curve III indicates the amount of the resultant force of the spring force indicated by the curve I and the spring force (the reaction force from the pin 86 of the frame 14) of the damper mechanism 31 indicated by the curve II.

The curves shown in FIG. 15 indicate how the force applied to the slider 13 changes when the sliding distance of the slider 13 changes. The coil spring 41 continues to apply the spring force to the slider 13 in the A direction. However, at the beginning of the sliding operation of the slider 13 performed as a result of the disk-cartridge inserting operation being performed, because the force in the B direction applied by the damper mechanism 31 is relatively large, the resultant force in the A direction applied to the slider 13 is small. Then, in the process in which the slider 13 slides in the A direction, as a result of the force in the B direction applied by the damper mechanism 31 decreasing, the resultant force in the A direction applied to the slider 13 increases.

As a result, the damper mechanism 31 not only effectively decelerates the slider 13 in the sliding operation when the disk cartridge is inserted into the disk holder 12, but also effectively increases the driving force immediately before the disk cartridge, inserted into the disk holder 12, is loaded in the disk device 11 so that the magnetic disk in the disk cartridge can be positively loaded on the turntable 15.

Further, when the thus-loaded disk cartridge is ejected from the disk device 11, the operation reverse to the above-described loading operation is performed. Therefore, while an operator is pressing the ejecting button 40, the operating force required for pressing the ejecting button 40 is reduced. Thereby, in the disk-cartridge ejecting operation, the operation force to be applied to the ejecting button 40 decreases in the process in which the slider 13 is pushed in the ejecting direction (B direction), and the disk cartridge can be positively ejected.

Further, in the disk-cartridge ejecting operation, the slider 13 can be pushed in the direction opposite to the direction in which the coil spring 41 applies the spring force to the slider 13. Thereby, the load borne by the latch lever 38 which prevents the slider 13 from moving can be reduced. As a result, it is possible to reduce the friction between the slider 13 and the latch lever 38, and, as a result, it is possible to reduce the force to be applied to the disk cartridge by an operator when the disk cartridge is inserted into the disk holder 12.

The arrangement of the head carriage 18 and the periphery thereof will now be described.

FIG. 16 shows a magnified plan view showing the head carriage 18 and the periphery thereof in an ejecting mode.

As shown in FIG. 16, the head arm 20 is supported rotatably in the upward and downward directions on a supporting stand 57 of the head carriage 18 via a leaf spring 58. The head arm 20 is pushed in the downward direction by a pushing portion 60a extending in the A direction from a torsion spring 60 which is wound around and hooked to a shaft 59 provided at a rear portion of the supporting stand 57.

Thereby, the projection 20a projecting laterally from the head arm 20 is pushed onto the top surface of the contact portion 25c of the lifter 25 by the spring force of the torsion spring 60. Because the engagement pin 25d projecting from the end portion of the lifter 25 engages with the V-shape recess portion 45c provided at the end portion of the carriage stopper 45, the lifter 25 rotates intermittently in response to a rotating operation of the carriage stopper 45, as will be described later.

Because the plunger 49 of the solenoid 48 is not attracted by electromagnetic force, the plunger 49 is moved in the D direction. Thereby, the first link 46A and the second link 46B of the link mechanism 46, engaging with the engagement pins 49a of the plunger 49, are maintained in the straightly extending condition as a result of being pulled by the torsion spring 47. As a result, the second link 46B pushes the connection pin 45d of the carriage stopper 45 in the C direction. Thereby, the rack 45b of the carriage stopper 45 engages with the movable rack 56 of the head carriage 18 and locks the head carriage 18.

Further, at a rear portion of the frame 14, an ejection detecting switch 54 which detects that the slider 13 has slid in the ejecting direction is provided. The ejection detecting switch 54 is caused to enter the closed condition as a result of being pushed by an end portion of the slider 13 which slides in the B direction as a result of the ejecting button 40 being pressed in the B direction.

The disk-cartridge loading operation of the above-described magnetic disk device 11 will now be described.

As shown in FIGS. 1 and 3, when the disk cartridge (not shown in the figures) is inserted into the disk holder 12 through the disk inserting hole 26 of the front bezel 27, the latch lever 38 is pushed and rotates clockwise. Then, when the movement-preventing portion 38b of the latch lever 38 thereby separates from the movement-to-be-prevented portion 13h of the slider 13, the slider 13, to which the force is applied by the coil spring 41, slides in the A direction.

As a result of the latch lever 38 rotating clockwise, the prevention of movement of the slider 13 is released as mentioned above, and, also, the shutter of the disk cartridge is opened by the projecting end portion 38c of the lever portion 38a.

Both sides of the disk holder 12 are supported by both side walls 14b, 14c of the frame 14 movably only in the upward and downward directions. As a result, when the slider 13 slides in the A direction, because the engagement pins 12e of the disk holder 12 are driven along the inclined cut-out portions 13d of the slider 13, the disk holder 12 falls from the cartridge insertion/ejection position to the cartridge loaded position.

Further, in the ejecting mode, the end portion of the slider 13, which portion extends in the B direction, is in contact with the ejection detecting switch 54, and causes the ejection detecting switch 54 to enter the closed condition. Thereby, the ejection detecting switch 54 outputs an ejection detection signal to the control circuit. Thereby, the solenoid 48 is de-energized, and, thereby, the plunger 49 moves in the D direction.

Further, in the ejecting mode, because the solenoid 48 is not energized, the first link 46A and the second link 46B of the link mechanism 46 are caused to extend straightly by the spring force Fa of the torsion spring 47. Thereby, the carriage stopper 45 is pushed in the direction toward the head carriage 18. As a result, the rack 45b is caused to engage with the movable rack 56 of the head carriage 18.

That is, the spring force Fa of the torsion spring 47 acts as the pushing force Fb by which the connection pin 45d of the carriage stopper 45 is pushed in the C direction, which engages with the fitting hole $46B_3$ of the link mechanism 46.

The head carriage 18 is driven in the A, B directions by the voice-coil motor 52. Therefore, when no driving force is supplied by the voice-coil motor due to absence of power supply or the like, the head carriage 18 would freely move if nothing else prevents movement of the head carriage 18. However, in the ejecting mode, because the rack 45b of the carriage stopper 45 engages with the movable rack 56 of the head carriage 18, and, thereby, locks the head carriage 18, the head carriage 18 can be prevented from freely moving.

When, in any other mode, absence of power supply occurs, no driving force is supplied by the voice-coil motor 52. However, because also the solenoid 48 is de-energized, the head carriage 18 is locked, and the head carriage 18 can be prevented from freely moving.

Figure 17:
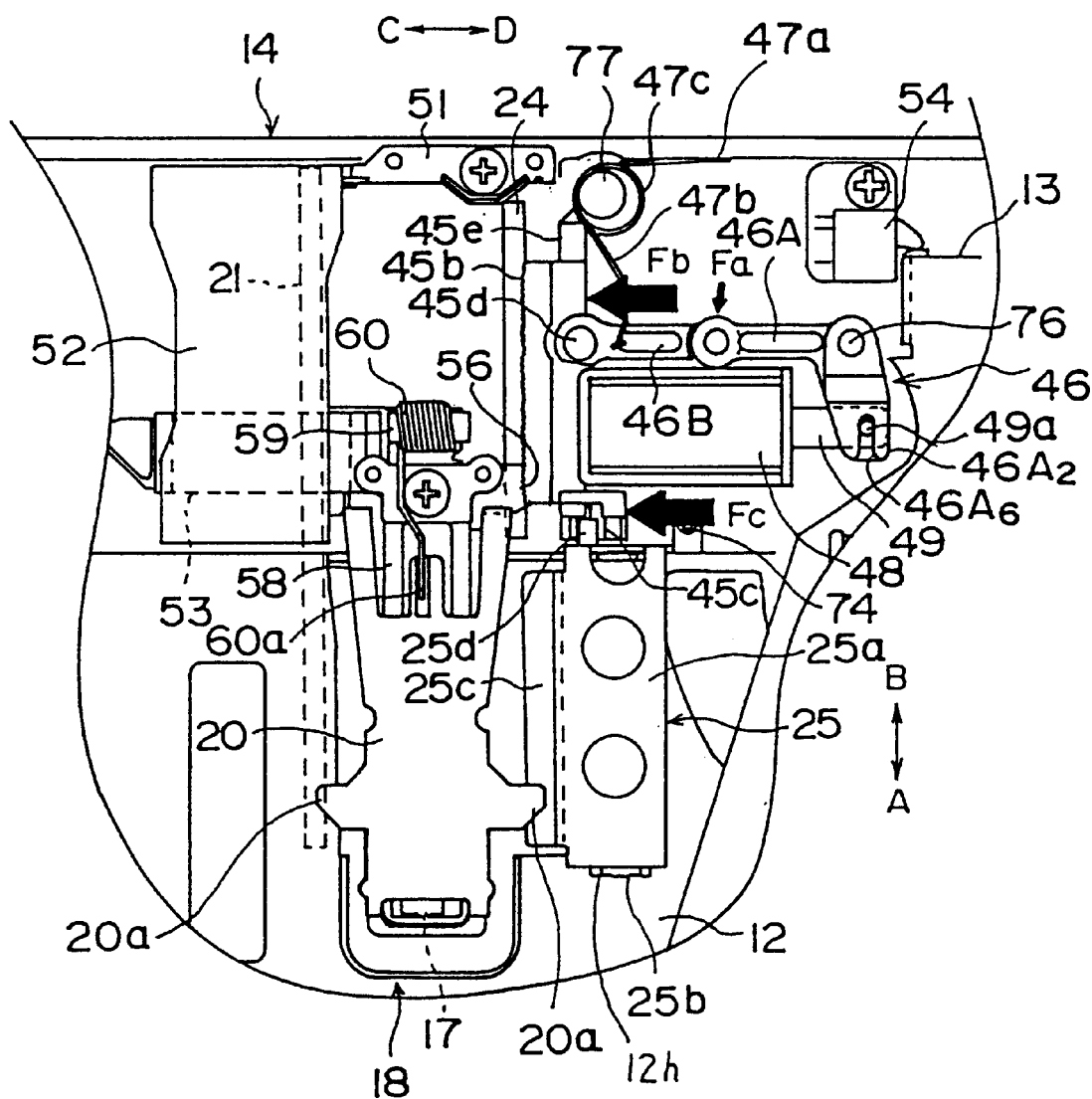
FIG. 17 shows a magnified plan view showing the head carriage and the periphery thereof in a waiting condition in a recording/reproducing mode.

FIG. 17 shows a magnified plan view showing the head carriage 18 and the periphery thereof in a waiting condition in the recording/reproducing mode.

As shown in FIG. 17, when the magnetic disk device 11 is in the waiting condition such as a stand-by condition, a sleep condition or the like in the recording/reproducing mode, the head carriage 18 does not perform the seeking operation. In this case, the solenoid 48 is de-energized. Thereby, similar to the case of the above-described ejecting mode shown in FIG. 16, the first link 46A and the second link 46B of the link mechanism 46 are caused to extend straightly by the spring force Fa of the torsion spring 47, and the carriage stopper 45 is pushed in the direction toward the head carriage 18. Thereby, the rack 45b engages with the movable rack 56 of the head carriage 18.

Thereby, in the waiting condition in the recording/reproducing mode, the head carriage 18 is locked so as to be prevented from moving in the A, B directions.

Figure 18:
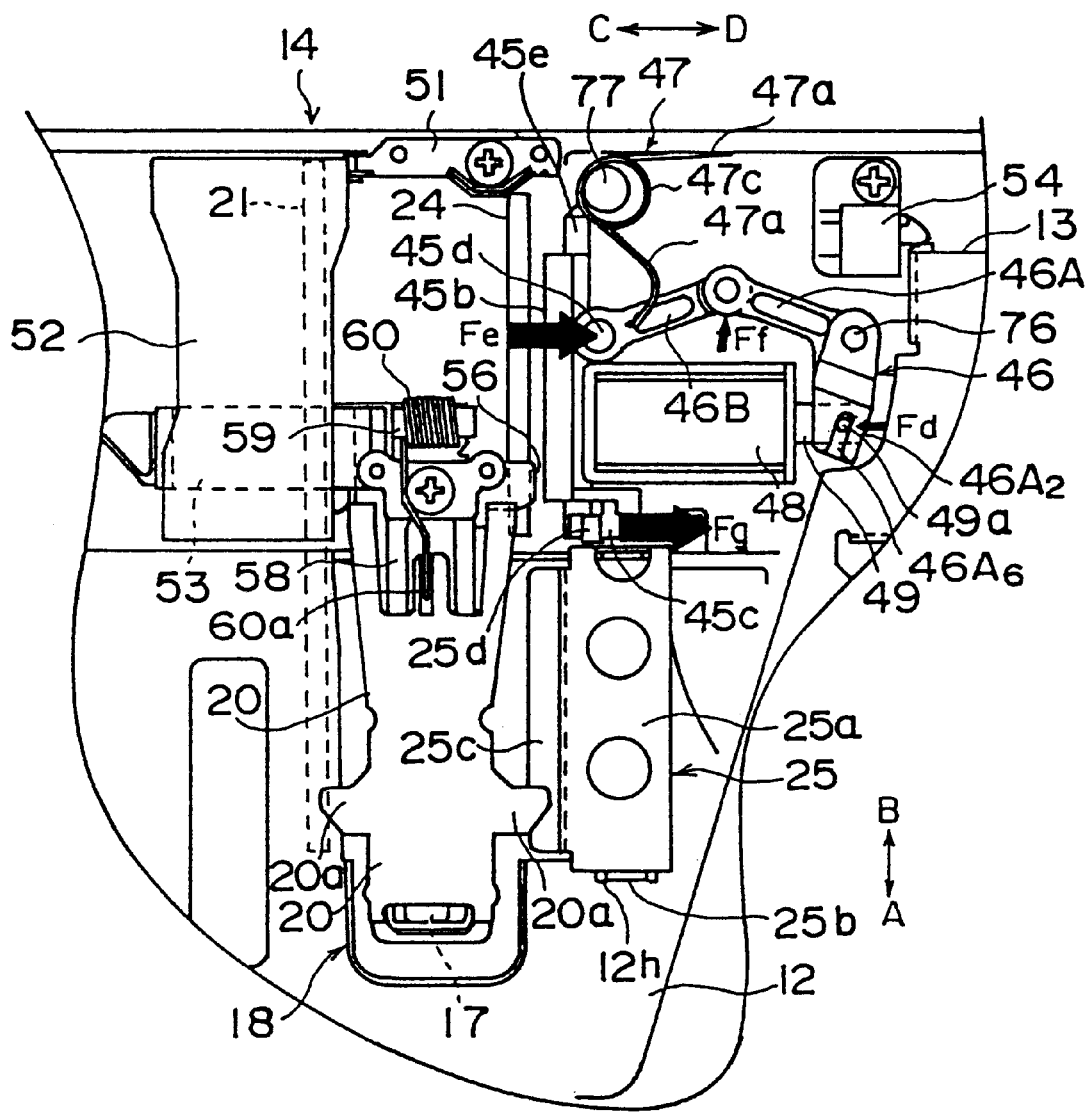
FIG. 18 shows a magnified plan view showing the head carriage and the periphery thereof in a case where a seeking operation is performed in the recording/reproducing mode.

FIG. 18 shows a magnified plan view showing the head carriage 18 and the periphery thereof in a case where the seeking operation is performed in the recording/reproducing mode.

As shown in FIG. 18, in this case, when the disk cartridge inserted into the disk holder 12 moves to the cartridge loaded position, a disk sensor (not shown in the figure) enters the ON condition, the rotation speed of the disk motor which drives the turntable 15 reaches a predetermined high speed, and, then, the solenoid 48 is energized.

Thus, in this case, the solenoid 48 is energized, and attracts the plunger 49 in the C direction. At this time, because the first link 46B of the link mechanism 46 is rotated clockwise, the attraction force of the solenoid 48 is increased, as will be described later.

Thus, the first link 46A and the second link 46B of the link mechanism 46 connected with the plunger 49 enter the bent condition, and the rack 45b of the carriage stopper 45 is caused to separate from the movable rack 56 of the head carriage 18. As a result, the locking of the head carriage 18 by the carriage stopper 45 is released.

Thereby, the head carriage 18 can perform the seeking operation, in radial directions (A, B directions) of the magnetic disk, by the driving force of the voice-coil motor 52. Thus, the magnetic heads 16, 17 can be caused to face desired tracks of the magnetic disk.

The plunger 49, which is attracted in the C direction as a result of the solenoid 48 being energized, engages with the engagement arm $46A_2$ of the first link 46A which is rotatably supported by the shaft 76 on the frame 14. Therefore, the attraction force Fd of the solenoid 48 is converted into the torque Ff which rotates the first link 46A, and becomes the force Fe which pulls the connection pin 45d in the D direction. The attraction force Fd of the solenoid 48 is increased in the process in which the attraction force Fd of the solenoid 48 is converted into the torque Ff, by which the first link 46A is rotated clockwise, and, also, the second link 46B is rotated counterclockwise, and, as a result of the second link 46B rotating, the connection pin 45d is pulled by the pulling force Fe in the D direction. Further, the attraction force Fd of the solenoid 48 also acts as the pushing force Fg by which the V-shaped recess portion 45c of the carriage stopper 45 pushes the engagement pin 25d of the lifter 25 in the D direction.

Therefore, even when the attraction force Fd of the solenoid 48 is small, this force is increased through the link mechanism 46 and is transmitted to the carriage stopper 45 and the lifter 25. Accordingly, even when the solenoid 48 is a small one, a sufficient driving force can be obtained. Thereby, power consumption of the solenoid 48 can be reduced, and, also, a space required for setting the solenoid 48 is reduced so that the device can be miniaturized.

The operation of the head arm 20 in response to the operations of the above-described carriage stopper 45, the link mechanism 46, the torsion spring 47, and the solenoid 48 will now be described.

Figure 19A:
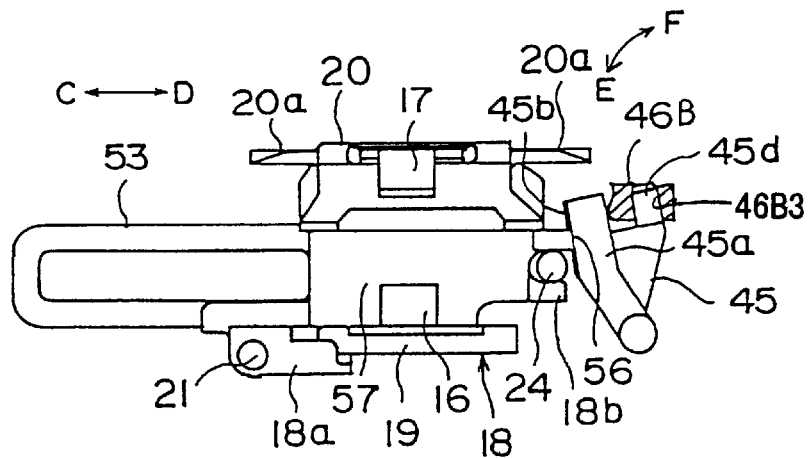
FIGS. 19A, 19B and 19C show front elevational views illustrating operation of a carriage stopper for the head carriage.
Figure 19B:
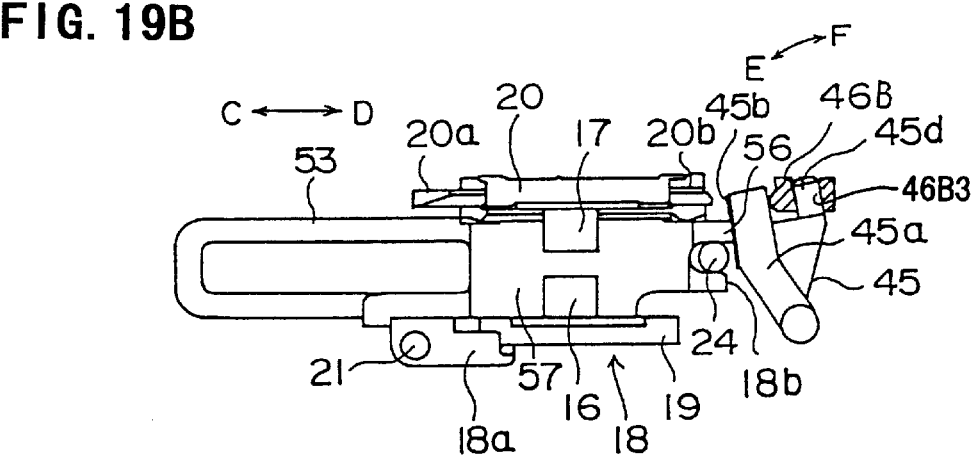
Figure 19C:
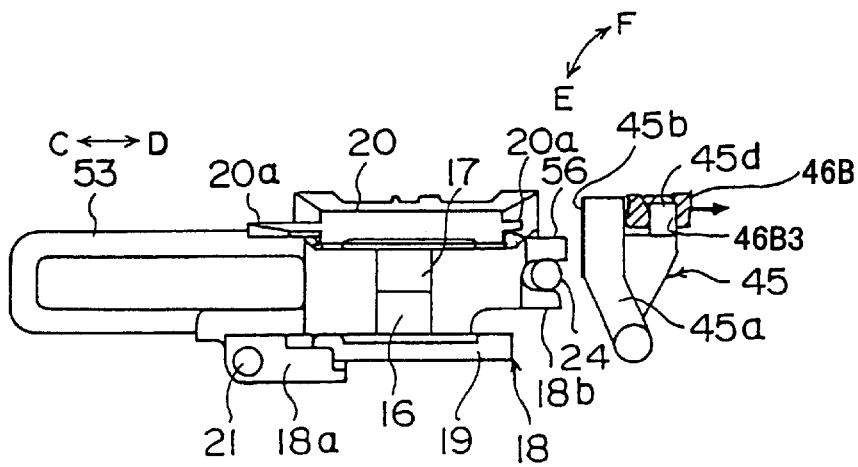

FIGS. 19A, 19B and 19C show front elevational views illustrating the operation of the carriage stopper 45 for the head carriage 18.

FIG. 19A shows the condition in the ejecting mode. The link mechanism 46 is pushed in the C direction by the spring force of the torsion spring 47. Thereby, the carriage stopper 45 rotates in the E direction by the spring force of the torsion spring 47, and the rack 45b engages with the movable rack 56 of the head carriage 18. Thus, the head carriage 18 is locked by the carriage stopper 45.

FIG. 19B shows the waiting condition in the recording/reproducing mode. In this condition, similar to the case in the ejecting mode, the link mechanism 46 is pushed in the C direction by the spring force of the torsion spring 47. Thereby, the carriage stopper 45 rotates in the E direction by the spring force of the torsion spring 47, and the rack 45b engages with the movable rack 56 of the head carriage 18 so that the head carriage 18 is locked.

FIG. 19C shows the condition in the case where the seeking operation is performed in the recording/reproducing mode. In this condition, as described above, the solenoid 48 is energized, and the second link 46B of the link mechanism 46 is driven in the D direction. Thereby, the carriage stopper 45 rotates in the F direction by the driving force of the solenoid 48, the rack 45b separates from the movable rack 56 of the head carriage 18, and, thus, locking of the head carriage 18 by the carriage stopper 45 is released. Thereby, the head carriage 18 can perform the seeking operation in the A, B directions.

Figure 20A:
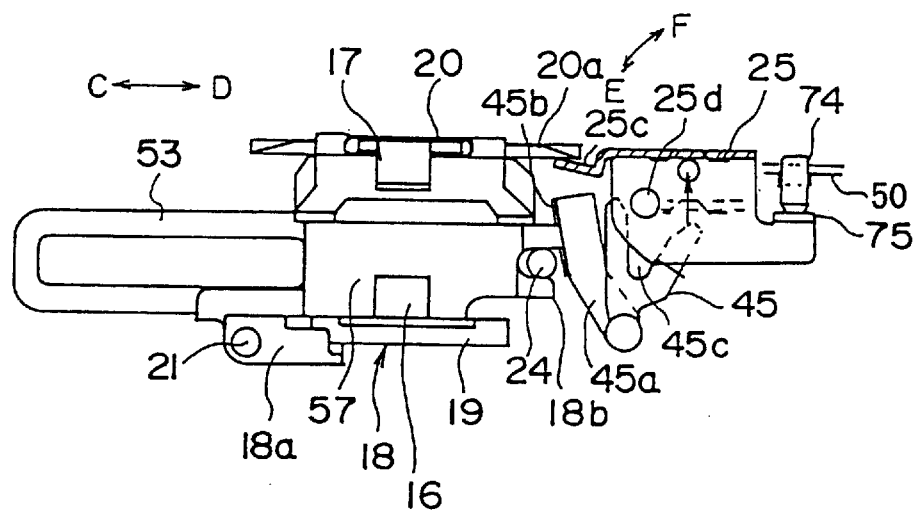
FIGS. 20A, 20B and 20C show front elevational views illustrating operations of the carriage stopper and a lifter for a head arm.
Figure 20B:
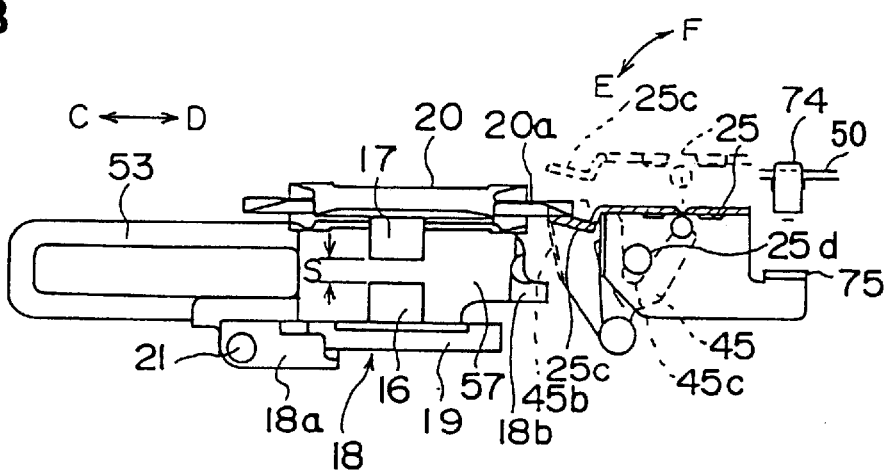
Figure 20C:
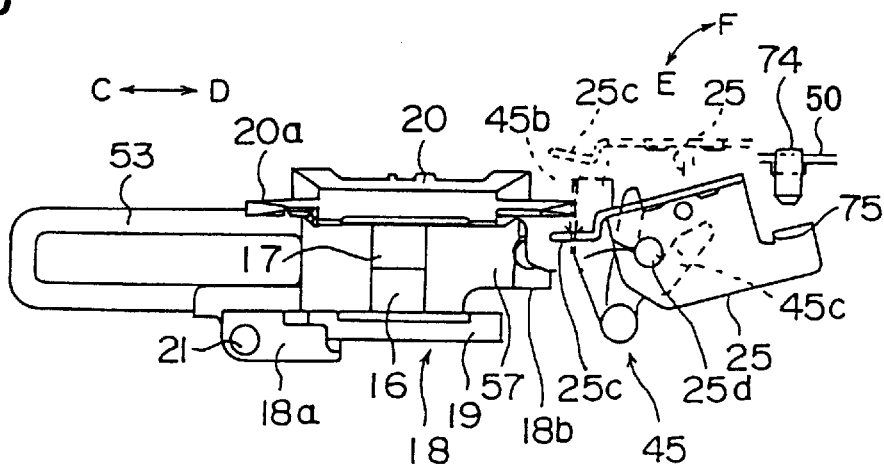

FIGS. 20A, 20B and 20C show front elevational views illustrating the operations of the carriage stopper 45 and the lifter 25 for the head arm 20.

FIG. 20A shows the condition in the ejecting mode. The carriage stopper 45 rotates in the E direction by the spring force of the torsion spring 47, and the rack 45b engages with the movable rack 56 of the head carriage 18. Further, because the disk holder 12 rises to the cartridge insertion/ ejection position, the lifter 25 also rises.

In the holding member 50, which is substantially fixed to the frame 14, an adjusting bolt 74 for adjusting the height of the lifter 25 is screwed. The bottom end of the adjusting bolt 74 comes into contact with a contact portion 75 which extends from the end of the lifter 25. Therefore, by changing the amount of screwing of the adjusting bolt 74 to the holding member 50, it is possible to adjust the amount of lifting of the lifter 25.

Further, in the process of lifting the disk holder 12 to the cartridge insertion/ejection position, the contact portion 75 provided integrally to the lifter 25 comes into contact with the bottom end of the adjusting bolt 74. The lifter 25 is supported on the top surface of the disk holder 12 rotatably in the E, F directions about the shafts 25b. Therefore, in response to the upward movement of the disk holder 12, the contact portion 75 extending rightward from the lifter 25 comes into contact with the bottom end of the adjusting bolt 74, and, thereby, the lifter 25 rotates in the F direction.

Further, the projection 20a projecting rightward from the head arm 20 is in contact with the contact portion 25c provided on the left side of the lifter 25. Therefore, when the lifter 25 rotates in the F direction in response to the upward movement of the disk holder 12, the projection 20a of the head arm 20 is lifted by the contact portion 25c. Thereby, the head arm 20 is maintained in the upward moved position in which the upper magnetic head 17 is apart from the lower magnetic head 16.

At this time, the engagement pin 25d of the lifter 25 is apart from the V-shape recess portion 45c of the carriage stopper 45.

FIG. 20B shows the waiting condition in the recording/ reproducing mode. In this condition, the head arm 20 temporarily stops at the intermediate position between the disk insertion/ejection position and the disk loaded position. At this time, in response to the falling movement of the disk holder 12, the engagement pin 25d projecting from the end portion of the lifter 25 in the B direction is inserted into the V-shaped recess portion 45c of the carriage stopper 45. Then, the engagement pin 25d of the lifter 25 is received by the V-shaped recess portion 45c of the carriage stopper 45, and comes into contact with the inclined portion of the V-shaped recess portion 45c.

Thus, the lifter 25 is stopped at the intermediate position midway from the disk insertion/ejection position to the disk loaded position. Therefore, the downward movement of the head arm 20 which moves together with the lifter 25 is temporarily stopped.

In this waiting condition, because the head arm 20 is stopped at the intermediate position before falling to the disk loaded position, the magnetic head 17 supported at the projecting end portion of the head arm 20 faces the magnetic head 16 supported at the projecting end portion of the carriage body 19 with a predetermined space S present therebetween. Thereby, the magnetic head 17 is located above the magnetic disk (not shown in the figure).

Further, the lower magnetic head 16 does not come into contact with the magnetic disk until the disk holder 12 falls to the cartridge loaded position. However, as a result of the disk holder 12 falling, the magnetic disk softly comes into contact with the lower magnetic head 16 due to the self-weight of the magnetic disk.

FIG. 20C shows the condition in the case where the seeking operation is performed in the recording/reproducing mode. In this condition, the solenoid 48 is energized and the link mechanism 46 is driven in the D direction, as described above. Thereby, the carriage stopper 45 rotates in the F direction by the driving force of the solenoid 48, and the rack 45b separates from the movable rack 56 of the head carriage 18. As a result, the locking of the head carriage 18 is released.

In response to the rotation of the carriage stopper 45 in the F direction, the V-shaped recess portion 45c of the carriage stopper 45 pushes the engagement pin 25d of the lifter 25 downward. Thereby, in response to the rotation of the carriage stopper 45 in the F direction, the lifter 25 rotates in the E direction, and the contact portion 25c of the lifter 25 falls.

Thereby, the head arm 20 falls. Accordingly, after stopping at the position in proximity to the magnetic disk (not shown in the figures) in the above-mentioned waiting condition, the upper magnetic head 17 supported by the head arm 20 comes into contact with the magnetic disk in response to the falling movement of the head arm 20 so that the upper magnetic head 17 and the lower magnetic head 16 come into contact with, and, thus, sandwich the magnetic disk.

Thus, the upper magnetic head 17 moves intermittently to the recording/reproducing position in which the upper magnetic head 17 comes into contact with the magnetic disk. As a result, the shock applied to the magnetic disk, which rotates at high speed, by the magnetic head 17 can be eased. Thereby, the magnetic film formed on the surface of the magnetic disk can be prevented from being damaged.

The ejecting operation is the operation reverse to the above-described loading operation, and description thereof will be omitted.

Figure 21:
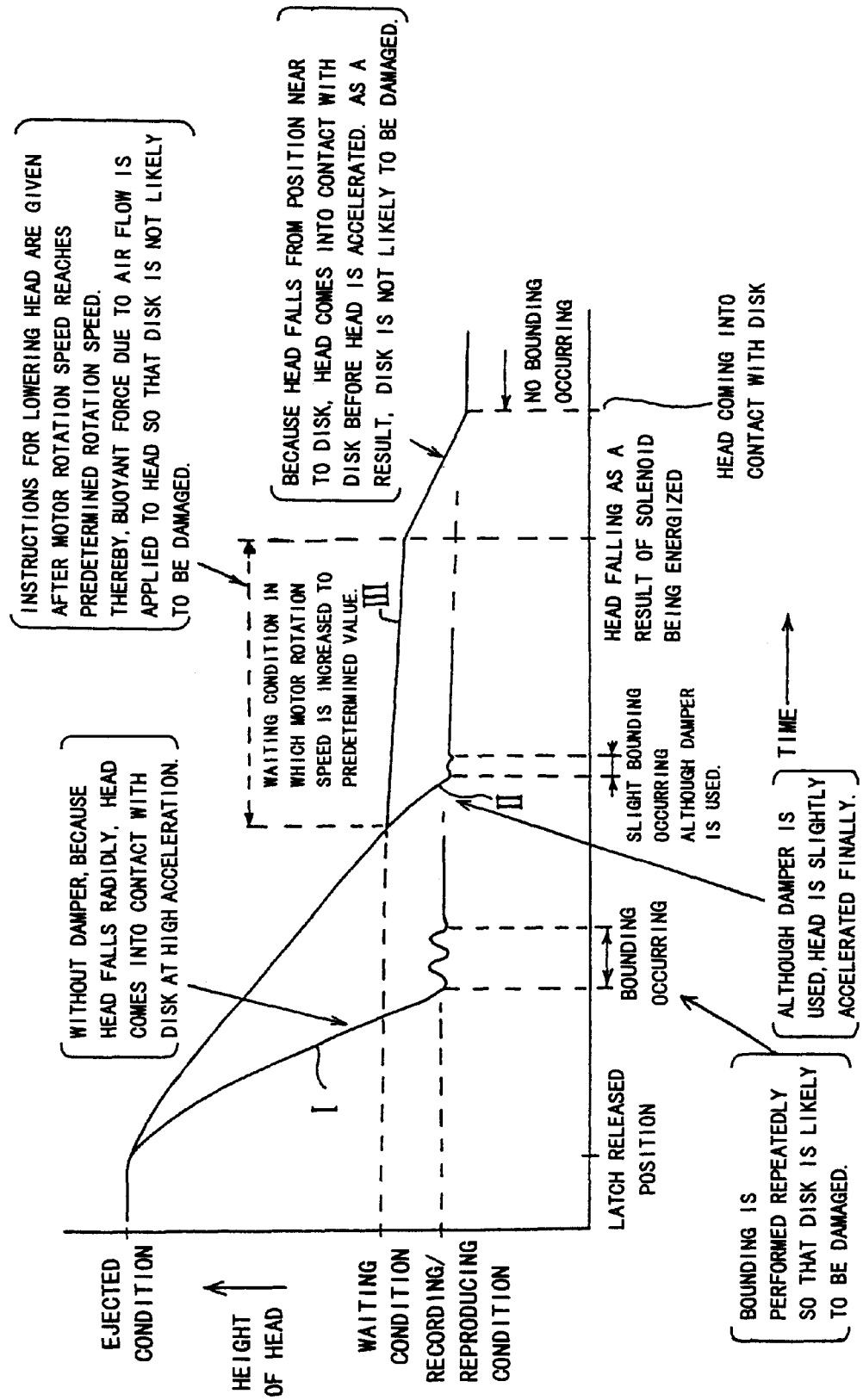
FIG. 21 shows results of experiments showing changes of the height of an upper magnetic head in a disk-cartridge loading operation.

FIG. 21 shows results of experiments showing changes of the height of the upper magnetic head 17. In FIG. 21, the curve I shows the characteristics of a device in the related art which does not use a damper. The curve II shows the characteristics of a device in the related art which uses a damper mechanism which decelerates the operation speed of the slider using a viscosity damper. The curve III shows the characteristics in the case where the head arm 20 falls stepwise as in the embodiment of the present invention.

When the curves I, II and III are compared with each other, it can be understood that there are the following differences:

In the case of the curve I where no damper is used, because the damper for decelerating the disk-cartridge loading operation is not provided, as a result of the sliding operation being performed by the slider, the disk holder and the head arm fall rapidly. Therefore, in the magnetic disk device which uses no damper, as a result of the disk-cartridge loading operation being performed, the upper magnetic head supported by the head arm rapidly falls, and pushes the magnetic disk onto the lower magnetic head.

As a result, due to the reaction force occurring when the upper magnetic head hits the lower magnetic head via the magnetic disk, the upper magnetic head bounds and hits the magnetic disk repeatedly. Thereby, the magnetic film formed on the surface of the magnetic disk is damaged.

In the case of the curve II where the damper is used, although the operation speed of the magnetic head is decelerated, because the disk holder and the head arm fall, at a stroke, from the disk (cartridge) insertion/ejection position to the disk (cartridge) loading position and the potential energy of the head arm is high, deceleration by the damper is not sufficient. Thereby, although the disk-cartridge loading operation is decelerated by the damper, the operation speed of the magnetic head is accelerated when the magnetic head comes into contact with the magnetic disk. Thus, in the magnetic disk device which uses the damper, although the falling speed of the magnetic head is decelerated in comparison to the case where no damper is used, because deceleration of the head arm is not sufficient, as a result of the upper magnetic head bounding when the upper magnetic head hits the lower magnetic head via the magnetic disk, the upper magnetic head hits the magnetic disk repeatedly. Thereby, there is a high possibility that the magnetic film formed on the surface of the magnetic disk is damaged.

In contrast to this, in the case where the operation speed of the slider 13 is decelerated through the deceleration operation of the mechanical damper mechanism 31 (see FIGS. 11 through 14), and, also, the falling operation of the head arm 20 is performed intermittently, according to the present invention, as indicated by the curve III shown in FIG. 21, it can be seen that the operation speed of the magnetic head 17 in the height direction changes stepwise and is the slowest.

In the case of the magnetic disk device 11 according to the present invention, the loading operations of the disk holder 12 and the head arm 20 are such that, as described above with reference to FIGS. 20A, 20B and 20C, in the waiting condition, the lifter 25 and the head arm 20 temporarily stop at the intermediate position between the disk insertion/ejection position and the disk loaded position.

In this waiting condition, while the magnetic head 17 supported at the extending end of the head arm 20 stops at the intermediate position in proximity to the magnetic head, the lower magnetic head 16 comes into contact with the magnetic disk because the disk holder 12 falls. However, because the magnetic disk comes into contact with the lower magnetic head 16 only due to the self-weight of the magnetic disk, the magnetic film of the magnetic disk is not damaged. In this waiting condition, the rotation speed of the disk motor which drives the turntable 15 reaches a predetermined rotation speed. Then, the solenoid 48 is energized so that the locking of the head carriage 18 is released, and, simultaneously, the rotation operation of the lifter 25 starts and the falling operation of the head arm 20 restarts.

When the head arm 20 falls as a result of the lifter 25 rotating, the magnetic disk pushed by the upper magnetic head 17 instantaneously pushes the lower magnetic head 16. However, the acceleration, at which the magnetic head 17 moves from the intermediate position at which the magnetic head 17 stops to the position at which the magnetic head 17 comes into contact with the magnetic disk, is small. As a result, the shock applied to the lower magnetic head 16 when the upper magnetic head 17 comes into contact with the lower magnetic head 16 via the magnetic disk is reduced.

Thus, the magnetic head 17 comes into contact with the magnetic disk at a slow speed from the position at which the magnetic head 17 is in proximity to the magnetic disk. As a result, the magnetic head 17 does not bound when coming into contact with the magnetic disk, and, thereby, the magnetic film is positively prevented from being damaged.

Further, as is understood from the curve III, the falling operation of the head arm 20 temporarily stops in the waiting condition. Thereby, the speed at which the magnetic head 17 comes into contact with the magnetic disk is sufficiently reduced. Further, it is electrically detected that the rotation speed of the disk motor which drives the turntable 15 reaches the predetermined rotation speed in the waiting condition, and, then, the solenoid 48 is energized so that the magnetic head 17 is caused to fall. As a result, buoyant force occurring due to the air flow on the magnetic disk is applied to the magnetic head 17 when the magnetic head 17 comes into contact with the magnetic disk. Thereby, the shock applied to the magnetic disk when the magnetic head 17 comes into contact with the magnetic disk is eased.

Although the above-described embodiment is the magnetic disk device, the present invention can also be applied to, for example, an optical disk device, a magneto-optical disk device, a recording/reproducing device in which a card-shaped recording medium such as a memory card or the like is loaded, and so forth.

Further, although the slider slides above the disk holder in the above-described embodiment, the present invention can also be applied to an arrangement in which the slider slides below the disk holder.

The present invention is not limited to the above-described embodiment, and variations and modifications may be made without departing from the scope of the present invention.

The contents of the basic Japanese Patent Application No. 10-045716, filed on Feb. 26, 1998, are hereby incorporated by reference.

What is claimed is:

1. A recording-medium recording/reproducing device, comprising:

a holder into which a recording-medium container is inserted;

a sliding member supported slidably in a recording-medium-container loading direction, said sliding member moving the holder from a recording-medium-container insertion/ejection position to a recording-medium-container loading position as a result of sliding in the recording-medium-container loading direction;

a latch member rotatably supported, said latch member having a to-be-pushed portion which is pushed by the recording-medium container which is being inserted into said holder, and having a movement-preventing portion which prevents said sliding member from moving in the recording-medium-container loading direction;

a first force-applying member, one end of said first force-applying member being connected with said latch member and the other end of said first force-applying member being connected with said sliding member, said first force-applying member applying force such as to rotate said latch member to cause said latch member to be in a position such as to prevent said sliding member from moving, and said first force-applying member applying force such as to move said sliding member in the recording-medium-container loading direction;

a rotating member rotatably provided within a sliding operation range of said sliding member; and a second force-applying member provided within the sliding operation range of said sliding member, one end of said second force-applying member being connected with said sliding member, the other end of said second force-applying member being connected with said rotating member.

2. The recording-medium recording/reproducing device as claimed in claim 1, wherein said rotating member and said second force-applying member are arranged so that said second force-applying member applies force to said sliding member in a direction reverse to the recording-medium-container loading direction during a first process starting when said sliding member is located at the recording-medium-container insertion/ejection position and ending when said rotating member has rotated a predetermined angle as a result of said sliding member sliding in the recording-medium-container loading direction, and applies force to said sliding member in the recording-medium-container loading direction during a second process starting when said rotating member has rotated said predetermined angle as a result of said sliding member sliding in the recording-medium-container loading direction and ending when said sliding member is located at the recording-medium-container loading position.

3. The recording-medium recording/reproducing device as claimed in claim 1, wherein:

said second force-applying means comprises a spring, one end of said spring being connected with said sliding member, and said spring being in a compressed condition so that an elastic force is applied to both ends of said spring;

said rotating member is rotatably supported on said sliding member, one end of said rotating member being connected with the other end of said spring, and the other end of said rotating member being connected with a frame of said device;

during a first process starting when said sliding member is located at the recording-medium-container insertion/ejection position and ending when said rotating member has rotated a predetermined angle as a result of said sliding member sliding in the recording-medium-container loading direction, said rotating member is at rotational angles such that the elastic force of said spring applied to said rotating member causes a reaction force from said frame to push said rotating member and said sliding member in a direction opposite to the recording-medium-container loading direction; and during a second process starting when said rotating member has rotated said predetermined angle as a result of said sliding member sliding in the recording-medium-container loading direction and ending when said sliding member is located at the recording-medium-container loading position, said rotating member is at other rotational angles such that the elastic force of said spring applied to said rotating member causes a reaction force from said frame to push said rotating member and said sliding member in the recording-medium-container loading direction.

4. The recording-medium recording/reproducing device as claimed in claim 1, wherein:

said recording-medium cartridge comprises a disk cartridge containing a magnetic disk;

said device further comprises a turntable on which said magnetic disk is loaded and by which said magnetic disk is rotated, and a magnetic head which is in close proximity to said magnetic disk so as to perform magnetic recording/reproducing on said magnetic disk, wherein:

upon insertion of said disk cartridge into said holder, said sliding member slides in the recording-medium-container loading direction as a result of said first force-applying member applying force to said sliding member; and in response to the movement of said sliding member in the recording-medium-container loading direction, said holder is lowered and said magnetic disk contained in said disk cartridge is lowered and loaded on said turntable.

5. The recording-medium recording/reproducing device as claimed in claim 1, further comprising:

a head carriage comprising a head arm and a carriage body, said head carriage being supported movably so as to perform a seeking operation;

an upper head supported by said head arm;

a lower head supported by said carriage body;

a carriage stopper rotatably supported on a frame of said device, and having a contact portion;

a solenoid including a plunger;

a link mechanism which connects said carriage stopper with said plunger; and a third force-applying member which pushes said link mechanism;

a lifting member, rotatably supported on said holder, for lifting said head arm;

wherein:

in an ejecting condition, said solenoid is not energized, and, as a result, said link mechanism pushes said carriage stopper as a result of being pushed by said third force-applying member so that said carriage stopper rotates in one direction, and, thus, locks said head carriage, and, as a result of said holder rising to the recording-medium container insertion/ejection position, said lifting member also rises, and, thus, comes into contact with a contact member fixed to said frame of said device so as to rotate in one direction so as to lift said head arm to a highest position;

in a waiting condition, said solenoid is not energized, and, as a result, said link mechanism pushes said carriage stopper as a result of being pushed by said third force-applying member so that said carriage stopper rotates in said one direction and locks said head carriage, and, as a result of said holder falling to the recording-medium container loading position, said lifting member is away from said contact member fixed to said frame of said device but comes into contact with said contact portion of said carriage stopper so as to lower said head arm to an intermediate position, and a recording medium contained in said recording-medium container comes into contact with said lower head;

in a recording/reproducing condition, said solenoid is energized, and, as a result, said link mechanism pulls said carriage stopper as a result of being pulled by said plunger of said solenoid so that said carriage stopper rotates in the other direction, and, thus, the locking of said head carriage by said carriage stopper is released, and, as a result of said carriage stopper rotating in said other direction, said contact portion of said carriage stopper rotates said lifting member in the other direction so that said head arm is further lowered to a lowest position at which said upper head comes into contact with the recording medium contained in said recording-medium container.

* * * * *